(12) United States Patent
Fang et al.

(10) Patent No.: US 11,902,742 B2
(45) Date of Patent: Feb. 13, 2024

(54) MICROPHONE CHIP, MICROPHONE, AND TERMINAL DEVICE

(71) Applicant: HUAWEI TECHNOLOGIES CO., LTD., Guangdong (CN)

(72) Inventors: Dongming Fang, Shenzhen (CN); Ming Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/681,285

(22) Filed: Feb. 25, 2022

(65) Prior Publication Data

US 2022/0182771 A1 Jun. 9, 2022

Related U.S. Application Data

(63) Continuation of application No. PCT/CN2020/095940, filed on Jun. 12, 2020.

(30) Foreign Application Priority Data

Aug. 30, 2019 (CN) .................. 201910817689.X

(51) Int. Cl.
*H04R 23/00* (2006.01)
*G01H 9/00* (2006.01)
*G02F 1/125* (2006.01)

(52) U.S. Cl.
CPC ........... *H04R 23/008* (2013.01); *G01H 9/004* (2013.01); *G02F 1/125* (2013.01); *H04R 2410/03* (2013.01)

(58) Field of Classification Search
None
See application file for complete search history.

(56) References Cited

U.S. PATENT DOCUMENTS

| 7,826,629 | B2 | 11/2010 | Miles et al. |
| 9,510,110 | B2 | 11/2016 | Lee et al. |
| 9,610,074 | B2 | 4/2017 | Martin |
| 2004/0130728 | A1 | 7/2004 | Degertekin et al. |

(Continued)

FOREIGN PATENT DOCUMENTS

| CN | 1760641 A | 4/2006 |
| CN | 103528665 A | 1/2014 |

(Continued)

OTHER PUBLICATIONS

Okandan et al., "Micromachined Microphones with Diffraction-Based Optical Displacement Detection", Acoustical Society of America, Jul. 11, 2005, 10 pages.

(Continued)

*Primary Examiner* — Kenny H Truong
(74) *Attorney, Agent, or Firm* — Fish & Richardson P.C.

(57) ABSTRACT

The disclosure provides a microphone chip, a microphone, and a terminal device. The microphone chip includes a substrate and a diaphragm that are disposed oppositely, a reflector located on a side that is of the diaphragm and that is close to the substrate, a grating group located between the substrate and the diaphragm, and an optical emitter and an optical detector that are located between the substrate and the grating group. The grating group includes a plurality of gratings, and distances between at least two gratings in the plurality of gratings and the reflector are different.

15 Claims, 14 Drawing Sheets

(56) References Cited

U.S. PATENT DOCUMENTS

| | | | |
|---|---|---|---|
| 2005/0018541 | A1 | 1/2005 | Johansen et al. |
| 2005/0105098 | A1 | 5/2005 | Johansen et al. |
| 2006/0227845 | A1 | 10/2006 | Degertekin et al. |
| 2007/0165896 | A1 | 7/2007 | Miles et al. |
| 2011/0038492 | A1 | 2/2011 | Miles et al. |
| 2016/0007108 | A1 | 1/2016 | Lee et al. |
| 2018/0075867 | A1 | 3/2018 | Dahl et al. |
| 2021/0274291 | A1* | 9/2021 | Angelskår .......... G01B 9/02051 |
| 2022/0167096 | A1* | 5/2022 | LaColle ............... H04R 23/008 |

FOREIGN PATENT DOCUMENTS

| | | |
|---|---|---|
| CN | 105308411 A | 2/2016 |
| CN | 105452832 A | 3/2016 |
| CN | 106792298 A | 5/2017 |
| CN | 108007379 A | 5/2018 |
| JP | 2003153396 A | 5/2003 |
| JP | 2005221267 A | 8/2005 |
| JP | 2006109193 A | 4/2006 |
| JP | 2016529480 A | 9/2016 |
| JP | 2018011238 A | 1/2018 |
| JP | 2018517325 A | 6/2018 |
| WO | 2019220103 A1 | 11/2019 |
| WO | 2021094747 A1 | 5/2021 |

OTHER PUBLICATIONS

Extended European Search Report in European Appln No. 20858536.4, dated Feb. 2, 2023, 12 pages.
Degertekin et al., "Capacitive Micromachined Ultrasonic Transducers with Integrated Optoelectronic Readout," IEEE Ultrasonics Symposium Oct. 2001, 7 pages.
Li et al., "Low-Cost, High-Performance Fiber Optic Fabry-Perot Sensor for Ultrasonic Wave Detection," Sensors, vol. 19, No. 2, Jan. 2019, 10 pages.
Liao et al., "Phase Demodulation of Short-Cavity Fabry-Perot Interferometric Acoustic Sensors With Two Wavelengths," IEEE Photonics Journal, vol. 9, Apr. 2017, 10 pages.
Liu et al., "MEMS-Based High-Sensitivity Fabry-Perot Acoustic Sensor With a 45° Angled Fiber," IEEE Photonics Technology Letters, vol. 28, No. 5, Mar. 2016, 4 pages.
Office Action issued in Chinese Application No. 201910817689.X dated May 19, 2021, 9 pages.
PCT International Search Report and Written Opinion issued in International Application No. PCT/CN2020/095940 dated Aug. 28, 2020, 17 pages (with English translation).
Shi et al., "MEMS-based filter integrating tunable Fabry-Perot cavity and grating, "Optics Communication, Nov. 1, 2017, 6 pages.
Zhang et al., "An Optical MEMS Acoustic Sensor Based on Grating Interferometer," Sensors, vol. 19, No. 7, Feb. 2019, 9 pages.
Zhou et al., "Optical fiber Fabry-Perot acoustic sensor based on large PDMS diaphragm," International Symposium on Precision Engineering, Measurements and Instruments, Mar. 2019, 8 pages.
Hall et al., "Micromachined microphones with diffraction-based optical displacement detection," The Journal of the Acoustical Society of America, vol. 118, No. 5, Nov. 2005, 11 pages.
Office Action in Japanese Appln. No. 2022-512819, dated May 9, 2023, 10 pages (with English translation).
Partial Supplementary European Search Report issued in European Application No. 20858536.4 dated Sep. 23, 2022, 13 pages.
Office Action in Japanese Appln. No. 2022-512819, dated Oct. 17, 2023, 9 pages (with English translation).

* cited by examiner

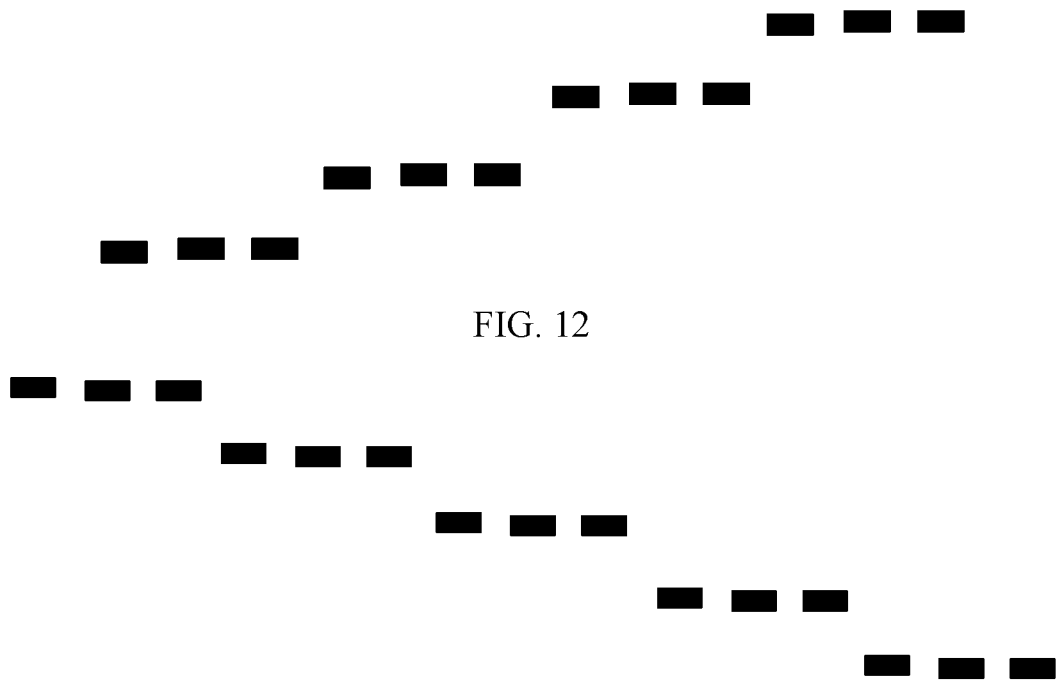
FIG. 12
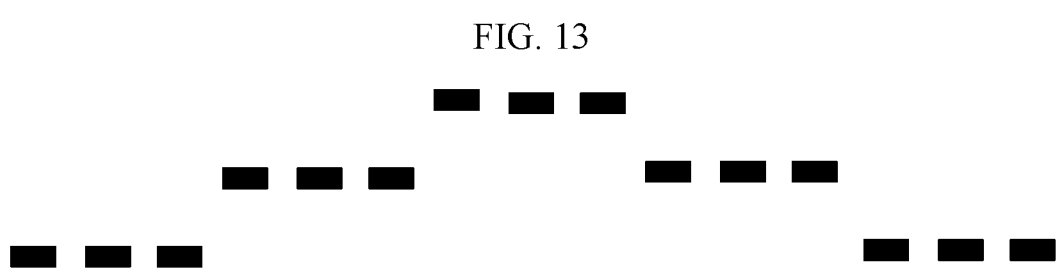
FIG. 13
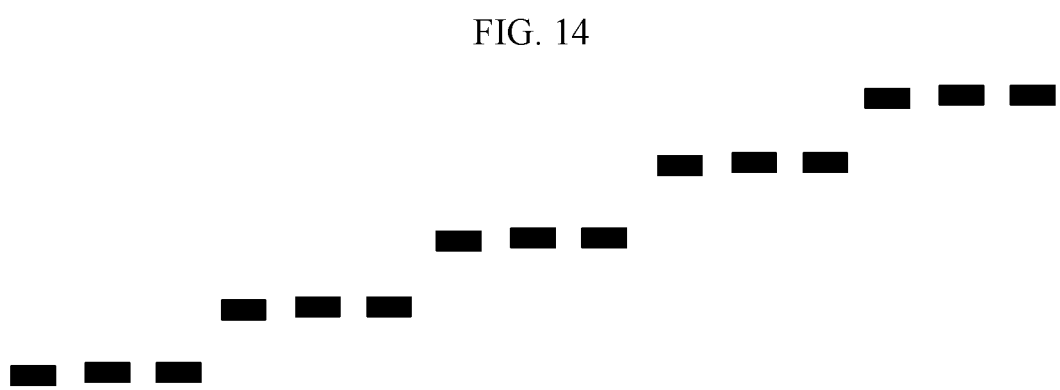
FIG. 14
FIG. 15

MICROPHONE CHIP, MICROPHONE, AND TERMINAL DEVICE

CROSS-REFERENCE TO RELATED APPLICATIONS

This application is a continuation of International Application No. PCT/CN2020/095940, filed on Jun. 12, 2020, which claims priority to Chinese Patent Application No. 201910817689.X, filed on Aug. 30, 2019. The disclosures of the aforementioned applications are hereby incorporated by reference in their entireties.

TECHNICAL FIELD

This application relates to the field of optical chips, and in particular, to a microphone chip, a microphone, and a terminal device.

BACKGROUND

An optical microphone is a microphone that uses a light wave as a carrier and receives an external sound signal through sensing by an optical fiber or an optical structure.

A microphone chip in an existing optical microphone may include a substrate and a diaphragm having a reflector that are disposed oppositely; a grating base on which a grating is disposed, an optical emitter, and an optical detector that are located between the substrate and the diaphragm; and a driving structure and a corresponding driving control circuit. When sound pressure acts on the diaphragm, the diaphragm is deformed, and the reflector under the diaphragm is driven to move downward. One part of light emitted by the optical emitter is reflected on a lower surface of the grating; and one part of the light emitted by the optical emitter is transmitted to the reflector after passing through slits of the grating, and is reflected on an upper surface of the grating again by the reflector. In this way, the light having an optical path difference is diffracted by the grating and a phase of the light is interfered. After receiving diffracted light of the grating, the optical detector converts an optical signal into an electrical signal, and transmits the electrical signal to a subsequent processing chip. Then, the processing chip demodulates the signal. The driving structure is connected to the diaphragm, and the driving structure may drive the diaphragm to move close to or away from the grating under control of the driving control circuit, to adjust a distance between the reflector and the grating and modulate the incident light.

However, because the driving structure and the driving control circuit are disposed in the microphone chip, on one hand, difficulty and complexity of a manufacturing process are increased, and on the other hand, mechanical noise and circuit noise are increased, and sound pickup performance of the microphone chip is affected.

SUMMARY

Embodiments of this application provide a microphone chip, a microphone, and a terminal device. The technical solutions are as follows.

According to a first aspect, a microphone chip is provided, where the microphone chip includes:

a substrate and a diaphragm that are disposed oppositely;
a reflector located on a side that is of the diaphragm and that is close to the substrate;
a grating group located between the substrate and the diaphragm; and
an optical emitter and an optical detector that are located between the substrate and the grating group, where
the grating group includes a plurality of gratings, and distances between at least two gratings in the plurality of gratings and the reflector are different.

According to the microphone chip provided in this embodiment of this application, the distances between the at least two gratings in the plurality of gratings and the reflector are different. Therefore, a change in a distance between the reflector and the grating can be implemented without disposing a driving structure and a driving control circuit. This structure is simple. Further, because the driving structure and the driving control circuit are not disposed, difficulty and complexity of a manufacturing process are reduced, and mechanical noise and circuit noise are reduced. Therefore, sound pickup performance of the microphone chip is effectively improved.

Further, distances between any two adjacent gratings and the reflector are different.

Optionally, a difference g between the distances between the at least two gratings in the plurality of gratings and the reflector meets $(2n-1)\times\lambda/8-\lambda/16 \leq g \leq (2n-1)\times\lambda/8+\lambda/16$, where $\lambda$ is a wavelength of light emitted by the optical emitter, and n is an integer greater than 0.

Optionally, the difference g between the distances between the at least two gratings in the plurality of gratings and the reflector is an odd multiple of $\lambda/8$, where $\lambda$ is the wavelength of the light emitted by the optical emitter.

In this embodiment of this application, the grating is replaced with the grating group. On the basis of the simplified structure, the difficulty of the manufacturing process is reduced, and it is ensured that the microphone chip is stably located in a linear working area, thereby improving detection sensitivity and a signal-to-noise ratio of the microphone.

Further, a difference between the distances between the any two adjacent gratings and the reflector is an odd multiple of $\lambda/8$.

In this embodiment of this application, the grating group may be fastened between the substrate and the diaphragm in a plurality of implementations. The following uses the following two implementations as examples for description.

In a first implementation, the grating group is fastened between the substrate and the diaphragm by using a grating base. The microphone chip further includes:

the grating base located between the substrate and the diaphragm, where the grating group is disposed on the grating base and the light emitted by the optical emitter passes through the grating base; and a support structure, where the support structure is fastened between the substrate and the diaphragm, and the grating base is firmly connected to the support structure.

Optionally, the plurality of gratings of the grating group are disposed on a side that is of the grating base and that is close to the diaphragm and/or a side that is of the grating base and that is far from the diaphragm; and the optical emitter and the optical detector are located on the substrate.

Optionally, the plurality of gratings in the grating group are located on a side that is of the grating base and that is close to the diaphragm; and the optical emitter and the optical detector are located on a side that is of the grating base and that is away from the diaphragm.

Optionally, the grating base is provided with a first hole.

In a second implementation, the grating group is fastened between the substrate and the diaphragm by using a support structure. The microphone chip further includes:

the support structure, where the support structure is fastened between the substrate and the diaphragm; and each grating is fastened on the support structure.

In the second implementation, the grating is directly fastened on the support structure without disposing the grating base, and the grating is similar to being suspended between the diaphragm and the substrate, thereby reducing thickness of the microphone chip and implementing miniaturization of the chip. In addition, because the grating base is not disposed, interaction between the grating base and the air can be avoided, thereby reducing noise caused by an air damping phenomenon.

Optionally, the diaphragm is provided with a second hole; and/or the grating includes a plurality of slits and a peripheral area that surrounds the plurality of slits, and a third hole is disposed in the peripheral area.

The first hole, the second hole, and the third hole all have a function of weakening the air damping phenomenon.

Optionally, a plurality of second holes are disposed on the diaphragm; and sizes of at least two second holes are different, and/or shapes of the at least two second holes are different.

For example, a size range of the second hole is 1 µm to 200 µm; and/or a total area of the second hole on the diaphragm accounts for 1% to 5% of a total area of the diaphragm.

According to a micro-perforation sound absorption theory, a hole is drilled on the diaphragm. If a quantity and a diameter that are of the second hole obtained through hole drilling are proper, the formed second hole is equivalent to the foregoing micro-hole, and has a sound absorption effect on high-frequency sound. A smaller size of the second hole indicates a higher frequency of absorption. In this way, high-frequency noise in an environment in which the microphone chip is located can be effectively filtered out.

Optionally, the diaphragm is a circular diaphragm.

When a shape of the diaphragm is circular, the diaphragm occupies a relatively small space area relative to a diaphragm whose shape is another shape, so that miniaturization of the microphone chip can be ensured. In addition, when the circular diaphragm is subject to force, stress around the circular diaphragm is even, the circular diaphragm is not easy to break, and a service life of the circular diaphragm is long. This can ensure stability of performance of the microphone chip.

Optionally, a shape of a boundary of the grating group is a circular shape or an arc shape.

In an optional example, when the microphone chip includes the grating base, and when the shape of the boundary of the grating group, the shape of the diaphragm, and a shape of the grating base are all circular, a volume of the microphone chip may be effectively reduced. In another optional example, when the microphone chip does not include the grating base, and when both the shape of the boundary of the grating group and the shape of the diaphragm are circular, the volume of the microphone chip can be effectively reduced.

Optionally, the microphone chip includes two optical emitters, and wavelengths of light emitted by the two optical emitters are respectively $\lambda_1$ and $\lambda_2$, where $\lambda$ meets $$\lambda = \frac{\lambda_1 \times \lambda_2}{|\lambda_1 - \lambda_2|}.$$

Detection ranges of the two wavelengths are increased from $\lambda_1/4$ or $\lambda_2/4$ of a single wavelength to $\lambda/4$. Maximum detection sensitivity is obtained when $h=\lambda/8$, where h is the distance between the reflector and the grating. The two wavelengths are set, so that a detection point with low detection sensitivity can be avoided, the linear working area of the microphone chip can be enlarged, and a measurement range of the microphone chip can be enlarged within a specific range.

In addition, when the wavelengths of the light emitted by the two optical emitters with different emission wavelengths are close, for example, a difference between $\lambda_1$ and $\lambda_2$ is less than 1, a larger multiplexed wavelength $\lambda$ is obtained by using the foregoing wavelength formula. Generally, a larger wavelength of light emitted by one optical emitter indicates relatively higher manufacturing costs of the optical emitter. Therefore, the two optical emitters with relatively small wavelengths are used to obtain the relatively large multiplexed wavelength $\lambda$, and an optical emitter with a relatively large wavelength does not need to be directly disposed, thereby reducing the manufacturing costs of the microphone chip.

Optionally, the microphone chip includes one optical emitter and three optical detectors, where the three optical detectors are separately configured to receive diffracted light at an order −1, diffracted light at an order 0, and diffracted light at an order +1 that are diffracted by the grating group.

Optionally, the microphone chip further includes:

a control circuit, where the control circuit is configured to control the optical emitter to emit light.

According to a second aspect, a microphone is provided, including the microphone chip according to the first aspect and a packaging structure of the microphone chip.

The microphone provided in this embodiment of this application may be used as an independent microphone, or may be used in scenarios in which a long-distance high-fidelity human voice needs to be picked up such as an intelligent speaker scenario, an automatic driving scenario, and a human-computer interaction scenario in fields such as the Internet of Things, the Internet of Vehicles, and a robot. The microphone provided in this embodiment of this application can be used to effectively improve detection sensitivity of an optical microphone, thereby improving performance such as a signal-to-noise ratio and a dynamic range of the optical microphone.

According to a third aspect, a terminal device is provided, including a processor, a memory, and the microphone chip according to the first aspect. For example, the terminal device may be used in scenarios such as an intelligent speaker scenario, an automatic driving scenario, and a human-computer interaction scenario in a field, for example, the Internet of Things, the Internet of Vehicles, or a robot.

The microphone chip is configured to collect a sound wave, convert the sound wave into an electrical signal, and input the electrical signal into the processor.

The processor is configured to process the electrical signal converted from the sound wave.

The memory is configured to store data obtained by performing processing on the electrical signal by the processor.

According to the microphone chip provided in the embodiments of this application, the distances between the at least two gratings in the plurality of gratings and the reflector are different. Therefore, the change in the distance between the reflector and the grating can be implemented without disposing the driving structure and the driving control circuit. The structure is simple. Further, because the driving structure and the driving control circuit are not disposed, the difficulty and the complexity of the manufacturing process are reduced, and the mechanical noise and the circuit noise are reduced. Therefore, the sound pickup performance of the microphone chip is effectively improved.

BRIEF DESCRIPTION OF DRAWINGS

FIG. 5 to FIG. 15 are respectively cross-sectional schematic diagrams of several grating groups according to an embodiment of this application;

DESCRIPTION OF EMBODIMENTS

Figure 1:
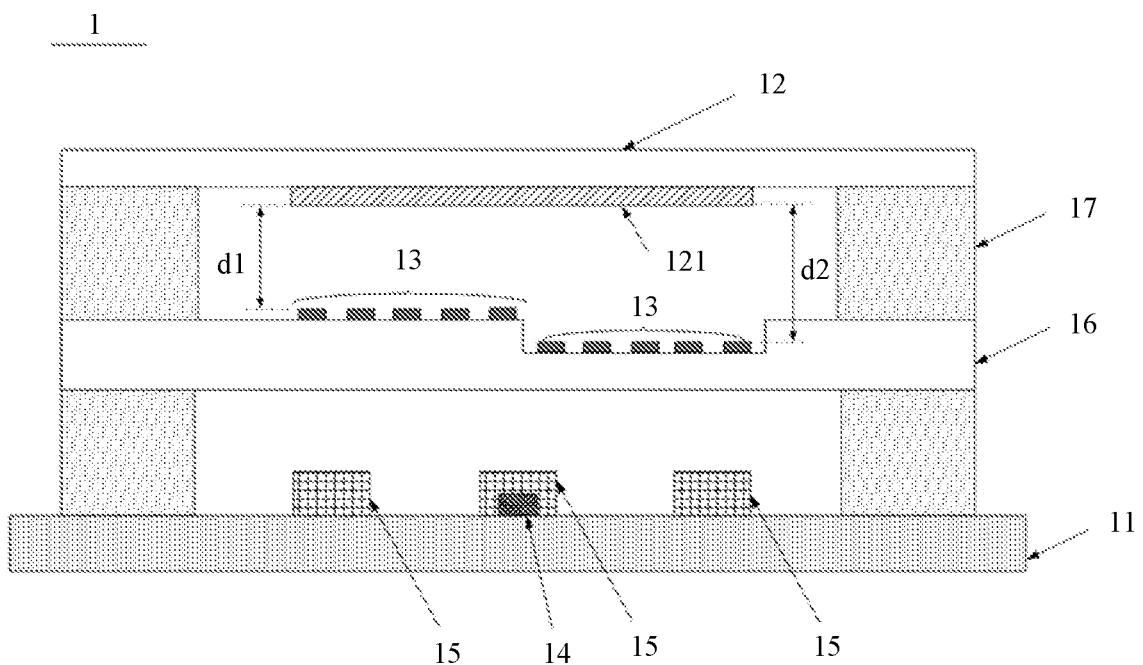
FIG. 1 is a schematic structural diagram of a microphone chip according to an embodiment of this application.

With development of an Internet of Things technology, there are more and more smart scenarios such as a smart car, a smart home, and a smart city. In these smart scenarios, sound pickup by using a microphone, especially reliable pickup of sound from a far distance, is a technical problem.

A signal-to-noise ratio (SNR) is an important indicator of microphone performance, and the signal-to-noise ratio of the microphone is equal to a ratio of a signal received by the microphone to inherent noise of the microphone. Microphone sensitivity indicates acousto-electrical conversion efficiency of the microphone. The inherent noise of the microphone includes mechanical noise and circuit noise (such as thermal noise, shot noise or dark current noise).

For a commonly-used electrical microphone (for example, an electret microphone or a condenser microphone), the microphone records a sound signal as well as various noise signals in a surrounding environment at the same time. If a recording distance is relatively far, a signal-to-noise ratio of the signal recorded by the microphone is insufficient. Consequently, the sound signal picked up by the microphone is blurred, and readability is poor. Therefore, an optical microphone has emerged. The optical microphone is a microphone that uses a light wave as a carrier and receives an external sound signal through sensing of an optical fiber or an optical structure. The optical microphone converts the sound signal into an optical signal. The optical microphone not only "picks up" a signal, but also "selects" a signal, to suppress various noise signals in an environment. Sound pickup of the optical microphone is more reliable than that of the electrical microphone. The optical microphone uses a photoacoustic sensing technology and a photoelectric signal demodulation technology to sense the sound signal and vibration, and has excellent performance that the conventional microphone does not have, such as high sensitivity, a strong anti-electromagnetic interference capability, a wide detection spectrum range, or long-distance surveillance of a call. The optical microphone is suitable for use in a complex electromagnetic environment and a harsh environment.

For ease of understanding, a working principle of the optical microphone is briefly described below. According to the working principle, the optical microphone may be classified into three types: an intensity modulation type, a phase modulation type and a polarization state modulation type. An optical microphone of the phase modulation type demodulates a signal by using a diffraction grating method. A diffraction grating is an optical element that periodically spatially modulates an amplitude or a phase (or both) of incident light by using a regular structure. A principle of the diffraction grating method is to change an optical path of the light by using sound pressure, so that an interference fringe of the grating is changed, an electric signal detected by an optical detector is changed, and a sound signal is restored by using a phase demodulation technology.

An embodiment of this application provides a microphone chip 1. The microphone chip 1 may also be referred to as a sound sensor or a microphone sensor. As shown in FIG. 1, the microphone chip 1 includes:

a substrate 11 and a diaphragm 12 that are disposed oppositely, where the substrate 11 and the diaphragm 12 are generally disposed in parallel; a reflector 121 located on a side that is of the diaphragm 12 and that is close to the substrate 11; a grating group located between the substrate 11 and the diaphragm 12; and an optical emitter 14 and an optical detector 15 that are located between the substrate 11 and the grating group.

The substrate 11 may be a piece of silicon or a printed circuit board (PCB). The optical emitter 14 is configured to emit light, and the optical detector 15 is configured to detect light diffracted by the grating group. For example, the optical emitter 14 may be a vertical cavity surface emitting laser (VCSEL) or another type of laser, and the optical detector is a photodetector (PD) or a diode optical detector.

In the microphone chip 1, the diaphragm 12 is a sensitive structure that senses sound pressure. Under action of external sound pressure, the diaphragm 12 is slightly deformed. Slight deformation may be calculated by the optical detector 15 based on a change in intensity of a detected optical signal, to calculate the sound pressure. A material of the diaphragm may be a semiconductor material (for example, monocrystalline silicon), a metal, a metal alloy, a high molecular polymer, or the like.

The reflector 121 may be attached to the diaphragm 12 in a manner of pasting or coating, and is configured to reflect light emitted by the optical emitter 14. For example, the reflector 121 is a metal thin film. Optionally, reflectivity of the reflector 121 is generally greater than 90%.

The grating group includes a plurality of gratings 13, and distances between at least two gratings 13 in the plurality of gratings and the reflector 121 are different. In this embodiment of this application, the distance between the grating and the reflector refers to a vertical distance between the grating and the reflector. In one case, the distance is a vertical distance between an upper surface of the grating and an upper surface of the reflector (that is, a gap between the two). In another case, the distance is a vertical distance between a lower surface of the reflector and the upper surface of the grating. This is not limited in this embodiment of this application. The grating 13 cannot be extremely thick, so that the light emitted by the optical emitter 14 can reach the reflector 121 after passing through the grating 13. Generally, the thickness of the grating 13 may be within a range of 10 nm to 100 µm. This is not specifically limited in this application.

As shown in FIG. 1, it is assumed that the grating group includes two gratings 13, and it is assumed that the distance between the reflector and the grating is the vertical distance between the lower surface of the reflector and the upper surface of the grating. In this case, distances between the two gratings 13 and the reflector 121 are respectively d1 and d2, where the distances are different.

Because the distance between the grating and the reflector needs to be implemented in an assembly manner, it is difficult for the distance to be made very precisely. Precision is usually at a level of 10 µm or even at a level of mm, and a requirement for precision cannot be met. Therefore, in a conventional microphone chip, a driving structure and a driving control circuit are disposed to adjust a location of a diaphragm 12. Therefore, a distance between a reflector and a grating meets the requirement, and sensitivity of a microphone chip is ensured. However, on one hand, difficulty and complexity of a manufacturing process are increased; and on the other hand, mechanical noise and circuit noise are increased. Therefore, a signal-to-noise ratio of the microphone chip cannot be ensured, and sound pickup performance of the microphone chip is affected.

However, according to the microphone chip provided in this embodiment of this application, the distances between the at least two gratings in the plurality of gratings and the reflector are different. Therefore, a driving structure and a driving control circuit do not need to be disposed to enable that a distance between at least one grating and the reflector meets the requirement and ensure sensitivity of the microphone chip. A structure is simple. Further, because the driving structure and the driving control circuit are not disposed, difficulty and complexity of a manufacturing process are reduced, mechanical noise and circuit noise are reduced, and a signal-to-noise ratio of the microphone chip is improved. Therefore, sound pickup performance of the microphone chip is effectively improved.

Figure 2:
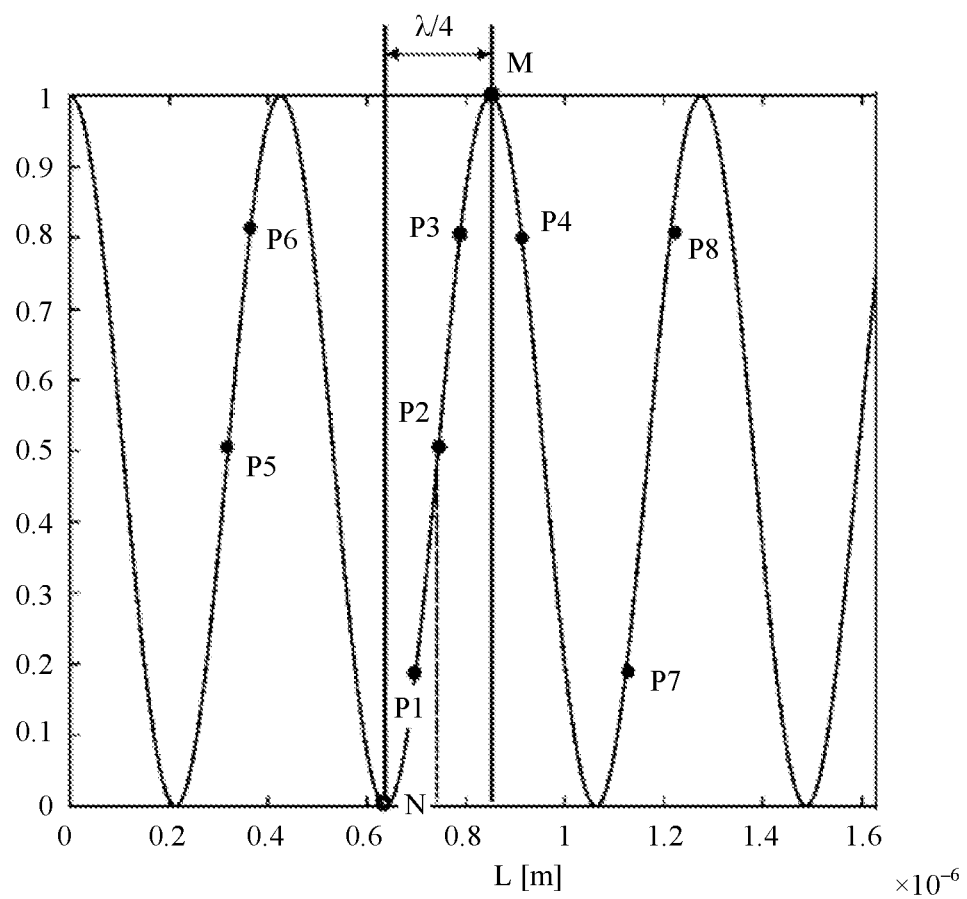
FIG. 2 is a schematic diagram of a relationship between output light intensity and a cavity length L of an F-P cavity according to an embodiment of this application.

Specifically, in this embodiment of this application, a cavity formed by the reflector 121 and the grating 13 is equivalent to a Fabry-Perot (F-P) cavity, and the distance between the reflector 121 and the grating 13 is equivalent to a cavity length L of the F-P cavity. FIG. 2 is a schematic diagram of a relationship between output light intensity and the cavity length L of the F-P cavity according to an embodiment of this application. A horizontal axis indicates the cavity length L, and a unit is $10^{-6}$ m (meter). A vertical axis indicates normalized (also referred to as standardized) output light intensity, and a unit is 1. It can be seen from FIG. 2 that, when a wavelength λ of incident light is a specific value, the relationship between the output light intensity and the cavity length L of the F-P cavity is represented by using an approximate cosine function. When the cavity length L is equal to an even multiple of λ/4, in other words, L=2 m×λ/4 (m is an integer), the output light intensity of the microphone chip obtains a maximum value (namely, a point M in FIG. 2). When the cavity length L is equal to an odd multiple of λ/4, in other words, L=(2 m+1)×λ/4 (m is an integer), the output light intensity of the microphone chip obtains a minimum value (namely, a point N in FIG. 2). In both the foregoing cases, the cosine function is nonlinear. The microphone chip has the lowest sensitivity. A section of cosine function in which a horizontal axis variation range of the cavity L is λ/4 in FIG. 2 is used as an example. At a point P2 of the cosine function (at this point, a slope of a cosine function curve is the maximum), the output light intensity has the best linearity and the highest sensitivity. At the point P2, when external disturbance to the microphone chip is very little (a cavity length variation ΔL satisfies: −λ/16<ΔL<λ/16, that is, the cavity length variation ΔL is λ/8, namely, a range from a point P1 to a point P3 in the figure). There is a linear relationship between the output light intensity and the cavity length L. A variation of the output light intensity is measured, to accurately deduce a change in external sound pressure.

It can be learned that, for the cavity length L of the F-P cavity, when an initial cavity length satisfies: L=n×λ/4+λ/8, the output light intensity has the best linearity, where n is an integer. On this basis, the cavity length variation ΔL satisfies: −λ/16<ΔL<λ/16, and there is the linear relationship between the output light intensity and the cavity length L, to be specific, $$\frac{n\lambda}{4} + \frac{\lambda}{16} \le L \le \frac{n\lambda}{4} + \frac{3\lambda}{16}.$$

The cavity length L is in a linear area in FIG. 2. In this embodiment of this application, that there is the linear relationship between the output light intensity of the microphone chip and the cavity length L is referred to as that the microphone chip is in a linear working area.

Optionally, in the microphone chip provided in this embodiment of this application, a difference g between the distances between the at least two gratings in the plurality of gratings and the reflector (namely, a drop or a height difference between the two in a vertical direction) is an odd multiple of λ/8, where λ is the wavelength of light emitted by the optical emitter. That is, the distance between the reflector and the grating group is not limited, and it only needs to be ensured that the drop g between the at least two gratings is the odd multiple of λ/8. It should be understood that there may be a difference between the difference g between the distances between the at least two gratings in the plurality of gratings and the reflector and the odd multiple of λ/8. The difference also falls within the protection scope of this application. For example, the difference between g and the odd multiple of λ/8 is less than or equal to λ/16. The grating can be implemented through micro-nano machining, and precision of the distance difference between two gratings can be accurate to a level of nm.

Distances between any two adjacent gratings and the reflector are different. Further, a difference g between the distances between the any two adjacent gratings and the reflector (namely, a drop or a height difference between the two in the vertical direction) is the odd multiple of λ/8.

Refer to the foregoing principle and FIG. 2. It is assumed that any grating in the grating group is a reference grating A.

If a distance L1 between the reference grating A and the reflector is in the linear area, a distance L2 between a grating B adjacent to the reference grating A and the reflector is generally in a nonlinear area. To be specific, L1 and L2 meet the following formulas:

$$\frac{n\lambda}{4} + \frac{\lambda}{16} \leq L1 \leq \frac{n\lambda}{4} + \frac{3\lambda}{16}; \text{ and} \quad \text{(Formula 1)}$$

$$\frac{n\lambda}{4} + \frac{\lambda}{16} + \frac{(2m+1)\lambda}{8} \leq L2 \leq \frac{n\lambda}{4} + \frac{3\lambda}{16} + \frac{(2m+1)\lambda}{8}, \quad \text{(Formula 2)}$$

where both m and n are non-negative integers, namely, 0, 1, 2, . . . , and so on.

In this case, a range of L2 is changed from Formula 2 to $$\frac{(n+m)\lambda}{4} + \frac{3\lambda}{16} \leq L2 \leq \frac{(n+m)\lambda}{4} + \frac{5\lambda}{16}. \quad \text{(Formula 3)}$$

It can be seen from FIG. 2 that L2 is in the non-linear area (namely, an area that is not a linear area) except endpoints of L2.

For example, it is assumed that the distance L1 between the reference grating A and the reflector is a corresponding distance between the point P1 and the point P3 in FIG. 2, namely, $$\frac{3\lambda}{4} + \frac{\lambda}{16} \leq L1 \leq \frac{3\lambda}{4} + \frac{3\lambda}{16},$$

and a difference g between the difference between the grating B and the reflector and the difference between the reference grating A and the reflector is λ/8, that is, n=3, and m=0. In this case, the distance $$\frac{3\lambda}{4} + \frac{3\lambda}{16} \leq L1 \leq \frac{3\lambda}{4} + \frac{5\lambda}{16}$$

between the grating B and the reflector, namely, the distance L2, is a corresponding distance (or referred to as a cavity length) between the point P3 and a point P4 in FIG. 2. Values of the point P4 and the point P3 on the vertical axis are the same. Obviously, only the endpoint P3 of this distance L2 is in the linear area, or is essentially not in the linear area.

If the distance L1 between the reference grating A and the reflector is not in the linear area, the distance L2 between the grating B adjacent to the reference grating A and the reflector is in the linear area. In the first case, L1 and L2 meet the following formulas:

$$0 < L1 < \frac{\lambda}{16}; \text{ and} \quad \text{(Formula 4)}$$

$$\frac{(2m+1)\lambda}{8} < L2 < \frac{\lambda}{16} + \frac{(2m+1)\lambda}{8}, \quad \text{(Formula 5)}$$

where m is a non-negative integer, namely, 0, 1, 2, . . . , and so on.

In the first case, the range of L2 is deformed as $$\frac{m\lambda}{4} + \frac{\lambda}{8} < L2 < \frac{m\lambda}{4} + \frac{3\lambda}{16}. \quad \text{(Formula 6)}$$

It can be seen form FIG. 2 that the distance L is in the linear area.

For example, it is assumed that m=1, and L2 is a corresponding distance between a point P5 to a point P6 in FIG. 2. Because a slope of a point in an area between the point P5 and the point P6 is the same as a slope of a corresponding point in an area between the point P2 to the point P3, the distance L2 between the grating B and the reflector is in the linear area. Values of the point and the corresponding point on the vertical axis are equal.

In the second case, L1 and L2 meet the following formulas:

$$\frac{p\lambda}{4} - \frac{\lambda}{16} < L1 < \frac{p\lambda}{4} + \frac{\lambda}{16}; \text{ and} \quad \text{(Formula 7)}$$

$$\frac{p\lambda}{4} - \frac{\lambda}{16} + \frac{(2m+1)\lambda}{8} < L2 < \frac{p\lambda}{4} + \frac{\lambda}{16} + \frac{(2m+1)\lambda}{8}, \quad \text{(Formula 8)}$$

where p is a positive integer, namely, 1, 2, . . . , and so on, and m is a non-negative integer, namely, 0, 1, 2, . . . , and so on.

In the second case, the range of L2 is deformed as $$\frac{(m+p)\lambda}{4} + \frac{\lambda}{16} < L2 < \frac{(m+p)\lambda}{4} + \frac{3\lambda}{16}. \quad \text{(Formula 9)}$$

It can be seen form FIG. 2 that the distance L2 is in the linear area.

For example, it is assumed that the distance between the reference grating A and the reflector is the corresponding distance between the point P3 and the point P4 in FIG. 2, and the difference g between the distance between the grating B and the reflector and the distance between the reference grating A and the reflector is 3λ/8, that is, p=4, and m=1. In this case, $$\frac{5\lambda}{4} + \frac{\lambda}{16} < L2 < \frac{5\lambda}{4} + \frac{3\lambda}{16},$$

and the distance L2 between the grating B and the reflector is a corresponding distance between a point P7 and a point P8 in FIG. 2. Because a slope of a point in an area between the point P7 and the point P8 is the same as a slope of a corresponding point in an area between the point P1 and the point P3, the distance L2 between the grating B and the reflector is in the linear area. Values of the point and the corresponding point on the vertical axis are equal.

It can be learned from the foregoing principle that, regardless of a distance between any grating in the grating group and the reflector, setting a grating in the grating group based on the distance difference can ensure that a distance between at least one grating and the diaphragm is in the linear area at any moment. In addition, as long as the distance between one grating and the diaphragm is in the linear area, it can be ensured that the microphone chip works in the linear working area. Therefore, that the difference g between the distances between the at least two gratings in the plurality of gratings and the reflector is the odd multiple of λ/8 can ensure that the microphone chip keeps working in the linear working area.

For example, it is assumed that the wavelength of the light emitted by the optical emitter is λ=850 nm (nanometer). To enable the microphone to be in the linear working area, a minimum difference g of the distances between the at least two gratings in the plurality of gratings and the reflector may be λ/8≈106.3 nm. A value of g may alternatively be 318.8 nm (3×λ/8), 531.3 nm (5×λ/8), or the like.

Further, in a diaphragm vibration process, even if a distance between one grating and the reflector is not in the linear area, a distance between another grating and the reflector is in the linear area. That is, mutual compensation is performed on the gratings. In addition, after assembly is completed, simple adjustment may be performed on the microphone chip, for example, the distance between the grating group and the reflector is adjusted. Then, simple detection is performed on the microphone chip, so that the microphone chip is located in the linear working area, and assembly, adjustment, and detection processes are relatively simple.

Improving detection sensitivity of the microphone chip can effectively improve the signal-to-noise ratio of the microphone chip, and a main measure to improve the detection sensitivity of the microphone chip is to enable the microphone chip to be in the linear working area. In the conventional microphone chip, the diaphragm is controlled by using the driving structure and the corresponding driving control circuit, so that a distance between the reflector and the grating is located in a linear area, but adjustment complexity is relatively high. In this embodiment of this application, the grating is replaced with the grating group. On the basis of the simplified structure, the difficulty of the manufacturing process is reduced, and it is ensured that the microphone chip is stably located in the linear working area, thereby improving the detection sensitivity and the signal-to-noise ratio of the microphone.

Figure 3:
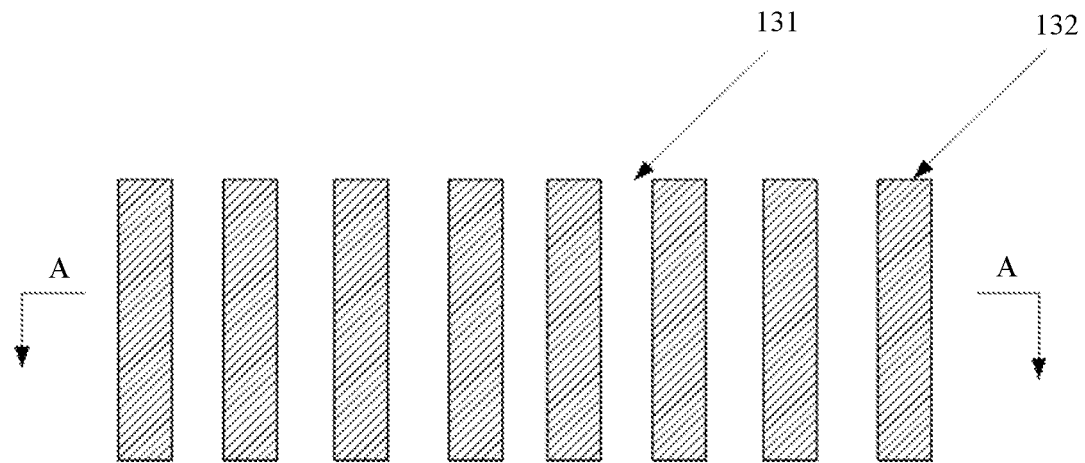
FIG. 3 and FIG. 4 are top-view schematic diagrams of two grating groups according to an embodiment of this application.
Figure 4:
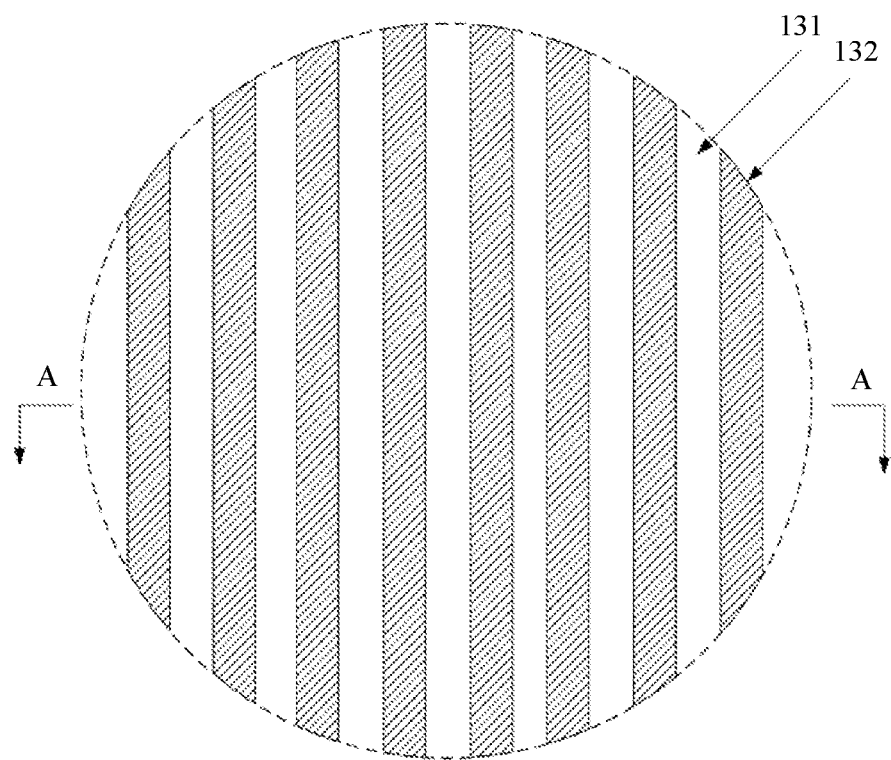

FIG. 3 and FIG. 4 are respectively top-view schematic diagrams of two grating groups according to an embodiment of this application. The grating is an optical element composed of a plurality of parallel slits 131. These slits 131 are formed by a plurality of parallel grating bars 132, where every two adjacent grating bars form one slit 131. In this embodiment of this application, the slits 131 of the grating may be of an equal width and an equal spacing (the spacing is a width of the grating bar), or may be of an unequal width and/or an unequal spacing. There may also be a plurality of shapes of a boundary of the grating group, as long as normal diffraction and phase interference functions of the grating group are ensured. The shape of the boundary of the grating group refers to a shape enclosed by an edge of orthographic projection of the grating group on the substrate, namely, a shape of a boundary of the grating group when the grating group is viewed from the top. A shape of a boundary of the grating group shown in FIG. 3 is a rectangle, and a shape of a boundary of the grating group shown in FIG. 4 is a circle. Optionally, the shape of the boundary of the grating group may alternatively be an ellipse, a trapezoid, a triangle, or another irregular shape. It is considered that a spot projected by the optical emitter is generally circular. When a boundary area of the grating group is slightly greater than or equal to an area of the projected spot, and when the shape of the boundary of the grating group is circular or an arc shape, a diffraction effect of the grating group on light is similar to that of a grating group whose shape of a boundary is another shape. However, an overall area of the grating group is reduced, and an occupied space area the grating group is relatively small. This can ensure miniaturization of the microphone chip.

Figure 5:
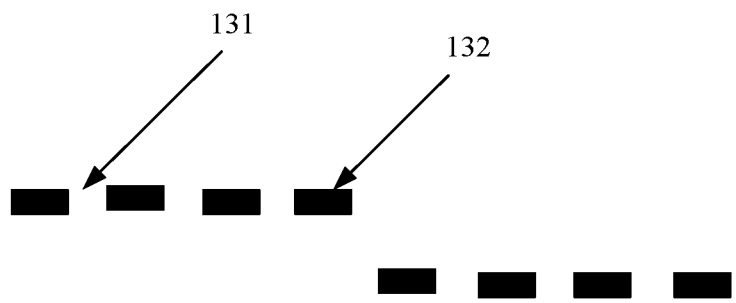
Figure 6:
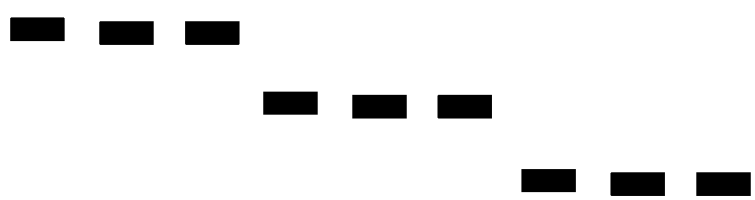
Figure 7:
Figure 8:
Figure 9:

Optionally, lengths of the grating bars in the grating may be equal or unequal. FIG. 3 and FIG. 4 are used as examples. Lengths of grating bars in the grating in FIG. 3 are equal, and lengths of grating bars in the grating in FIG. 4 are unequal. A cross section of each grating bar may be of a rectangle, a triangle, a zigzagged shape, an irregular shape, or the like. For ease of description, in subsequent embodiments, that the cross section of each grating bar 132 is the rectangle is used as an example for description. For example, refer to FIG. 5. FIG. 5 is a schematic diagram of a cross section A-A of the grating group shown in FIG. 3 or FIG. 4. In FIG. 5, that the cross section of each grating bar 132 is of the rectangle is used as an example for description. It should be noted that, in FIG. 5, an implementation of the grating group with two gratings is that "the left grating is high and the right grating is low". Actually, the implementation of the grating group may alternatively be that "the left grating is low and the right grating is high".

Further, shapes and/or sizes of different gratings in the grating group may be the same or different. This is not limited in this embodiment of this application. When the shapes and/or the sizes of the gratings in the grating group are the same, the difficulty and the complexity of the manufacturing process may be reduced.

Figure 10:
Figure 11:

The grating group in this embodiment of this application may be obtained by combining a plurality of gratings in a plurality of forms, as long as it is ensured that a difference between distances between at least two gratings in the plurality of gratings and the reflector meets the foregoing difference formulas. FIG. 5 to FIG. 15 are structures of several example grating groups according to an embodiment of this application. FIG. 5 is a schematic structural diagram when the grating group includes two gratings (in other words, the grating group is of a two-grating structure). FIG. 6 to FIG. 9 are schematic structural diagrams when the grating group includes three gratings (in other words, the grating group is of a three-grating structure). FIG. 10 to FIG. 12 are schematic structural diagrams when the grating group includes four gratings (in other words, the grating group is of a four-grating structure). FIG. 13 to FIG. 15 are schematic structural diagrams when the grating group includes five gratings (in other words, the grating group is of a five-grating structure). Any schematic structural diagram in FIG. 5 to FIG. 15 may be the diagram of the cross-section A-A of the grating group shown in FIG. 3 or FIG. 4. It should be noted that the grating group in this embodiment of this application may be a deformed structure obtained after one or more operations such as axial symmetry, central symmetry, and angular rotation are performed on a grating cross section (namely, the foregoing cross section A-A) based on the two-grating structure with a distance difference. The grating group may alternatively include six gratings, seven gratings, or the like, and a cross-sectional shape of the grating group may alternatively be another shape. Details are not described in this embodiment of this application again.

It should be noted that density degrees of the grating bars and a quantity of the grating bars of each grating in FIG. 5 to FIG. 15 are merely schematic drawings. This is not limited in this embodiment of this application.

In this embodiment of this application, the grating group may be fastened between the substrate and the diaphragm in a plurality of manners. The following uses the following two implementations as examples for description.

In a first implementation, the grating group is fastened between the substrate and the diaphragm by using a grating base. As shown in FIG. 1 and FIG. 16 to FIG. 21, the microphone chip 1 further includes:

a grating base 16 located between the substrate 11 and the diaphragm 12, where the grating group is disposed on the grating base 16 and the light emitted by the optical emitter 14 passes through the grating base 16, and the grating base 16 may be disposed in parallel with the substrate; and a support structure 17, where the support structure 17 is fastened between the substrate 11 and the diaphragm 12, and the grating base 16 is firmly connected to the support structure 17.

Figure 16:
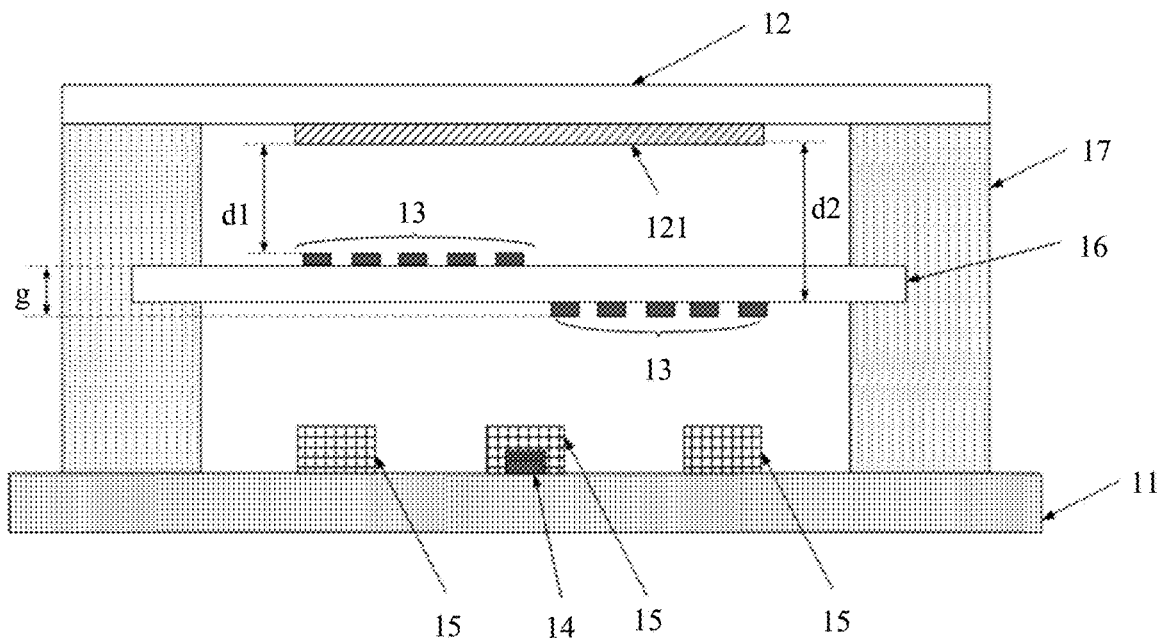
FIG. 16 to FIG. 22 are respectively schematic structural diagrams of several microphone chips according to an embodiment of this application.

The grating base 16 may have a plurality of shapes, for example, a stepped shape shown in FIG. 1, FIG. 17 to FIG. 21, or a plate shape shown in FIG. 16, as long as the grating group is effectively fixed and that the foregoing distance difference exists between the gratings in the fixed grating group. The plate-shaped grating base is used to fix the grating group. This can simplify manufacturing difficulty and reduce manufacturing costs of the grating base.

A material of the grating base needs to match the light emitted by the emitter, to ensure that the light emitted by the optical emitter 14 can passes through the grating base. For example, if the light emitted by the emitter 14 is visible light, the grating base 16 may be made of a transparent material, for example, transparent plastic, glass, or quartz. If the light emitted by the emitter 14 is infrared light, the grating base 16 may be made by using a filter capable of transmitting infrared light (in other words, the filter is used to filter light other than the infrared light).

The grating group may be fastened on the grating base by being directly manufactured, pasted, transfer-printed, or the like on the grating base. In this embodiment of this application, the grating in the grating group may be fastened on at least one side of the grating base 16 based on a situation, and locations of the optical emitter 14 and the optical detector 15 may be adjusted accordingly. In this embodiment of this application, a disposing manner of the grating in the grating group is described by using the following several optional manners as examples.

In a first optional manner, as shown in FIG. 1 and FIG. 17 to FIG. 21, the plurality of gratings 13 of the grating group are disposed on a side that is of the grating base 16 and that is close to the diaphragm 12.

Figure 20:
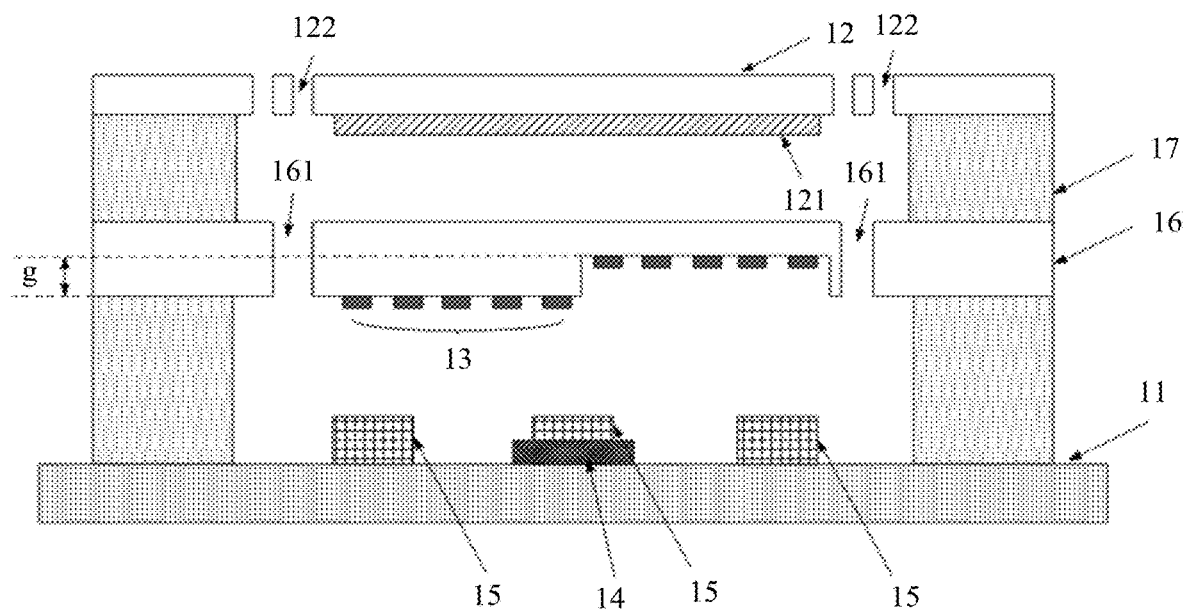

In a second optional manner, as shown in FIG. 20, the plurality of gratings 13 of the grating group are disposed on a side that is of the grating base 16 and that is away from the diaphragm 12.

In a third optional manner, as shown in FIG. 16, the plurality of gratings 13 of the grating group are disposed on the side that is of the grating base 16 and that is close to the diaphragm 12 and the side that is of the grating base 16 and that is away from the diaphragm 12. In other words, some gratings 13 in the grating group are disposed on the side that is of the grating base 16 and that is close to the diaphragm 12, and the other gratings 13 in the grating group are disposed on the side that is of the grating base 16 and that is away from the diaphragm 12.

In the foregoing three optional manners, the optical emitter 14 and the optical detector 15 are located on the substrate 11.

Figure 17:
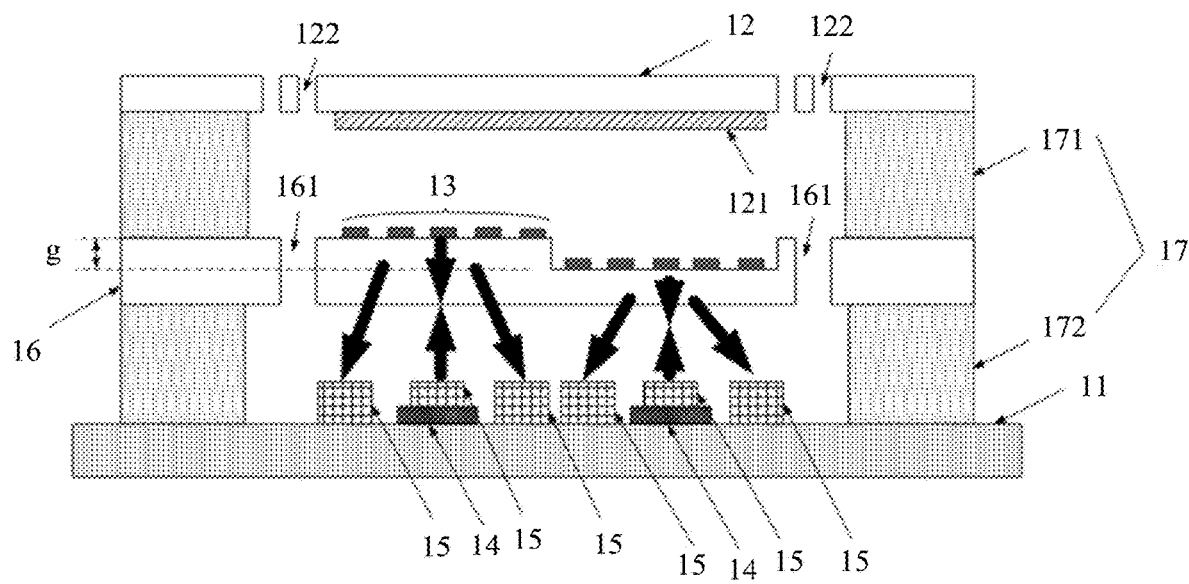
Figure 18:
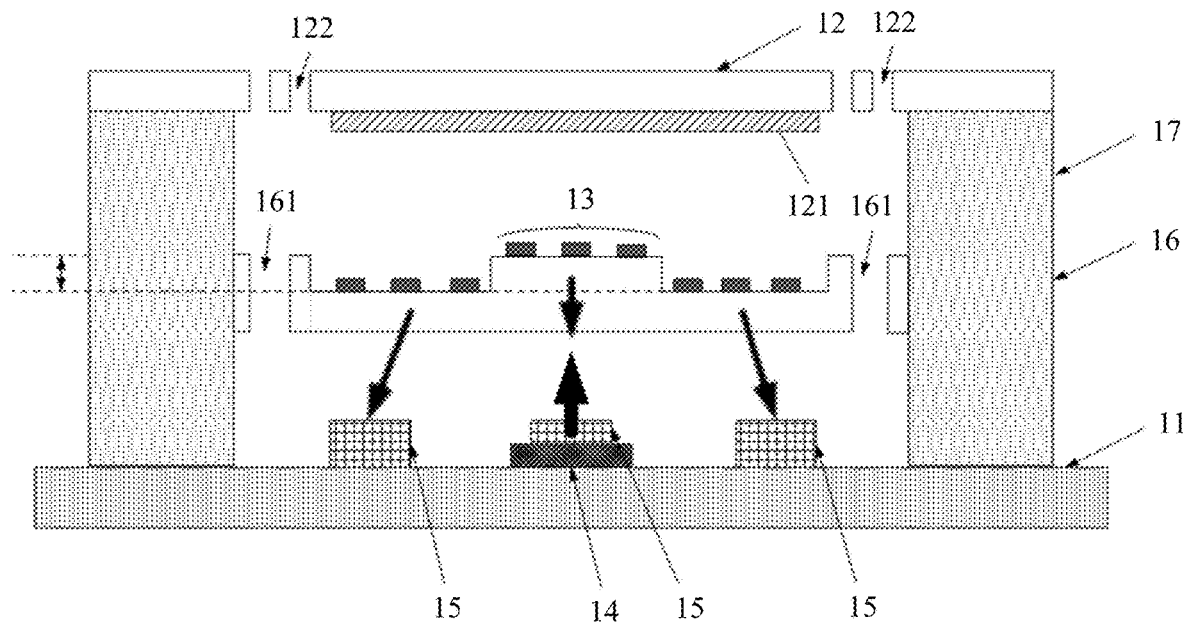
Figure 19:
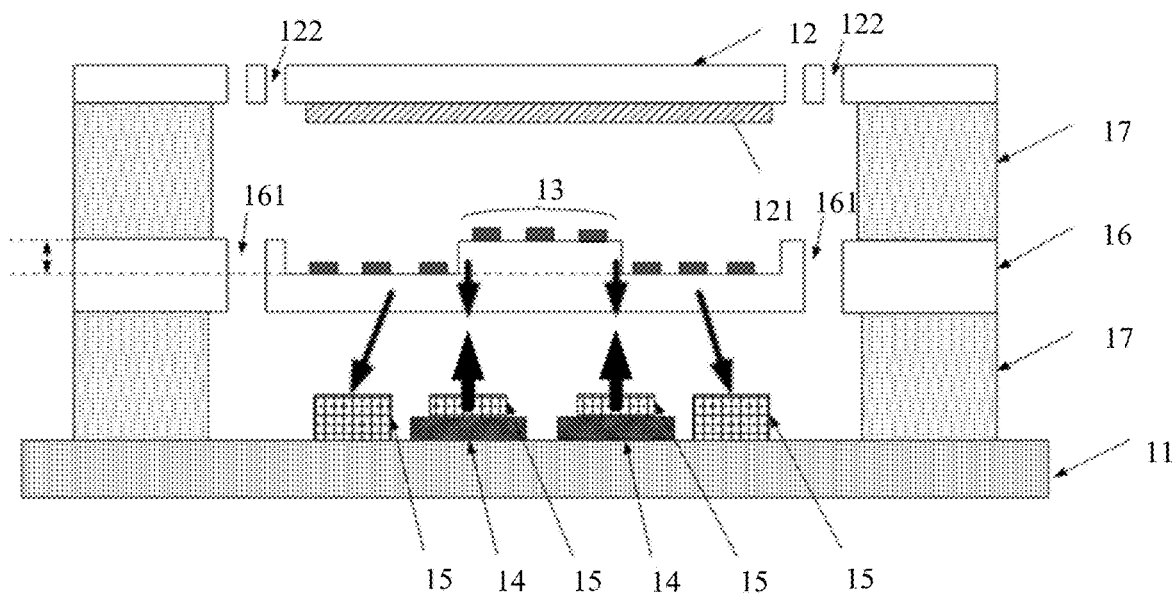

FIG. 17 to FIG. 19 are used as examples to describe a working principle of the microphone chip provided in this embodiment of this application. When the sound pressure acts on the diaphragm, the diaphragm 12 is deformed, and the reflector 121 under the diaphragm 12 is driven to move upward or downward. One part of the light emitted by the optical emitter 14 is reflected on the lower surface of the grating 13; and one part of the light emitted by the optical emitter 14 is transmitted to the reflector 121 after passing through the slits of the grating, and is reflected on the upper surface of the grating 13 again by the reflector 121. In this way, the light having an optical path difference is diffracted by the grating 13 and a phase of the light is interfered. After receiving diffracted light of the grating, the optical detector 15 converts an optical signal into an electrical signal, and transmits the electrical signal to a subsequent processing chip. Then, the processing chip demodulates the signal.

Figure 21:
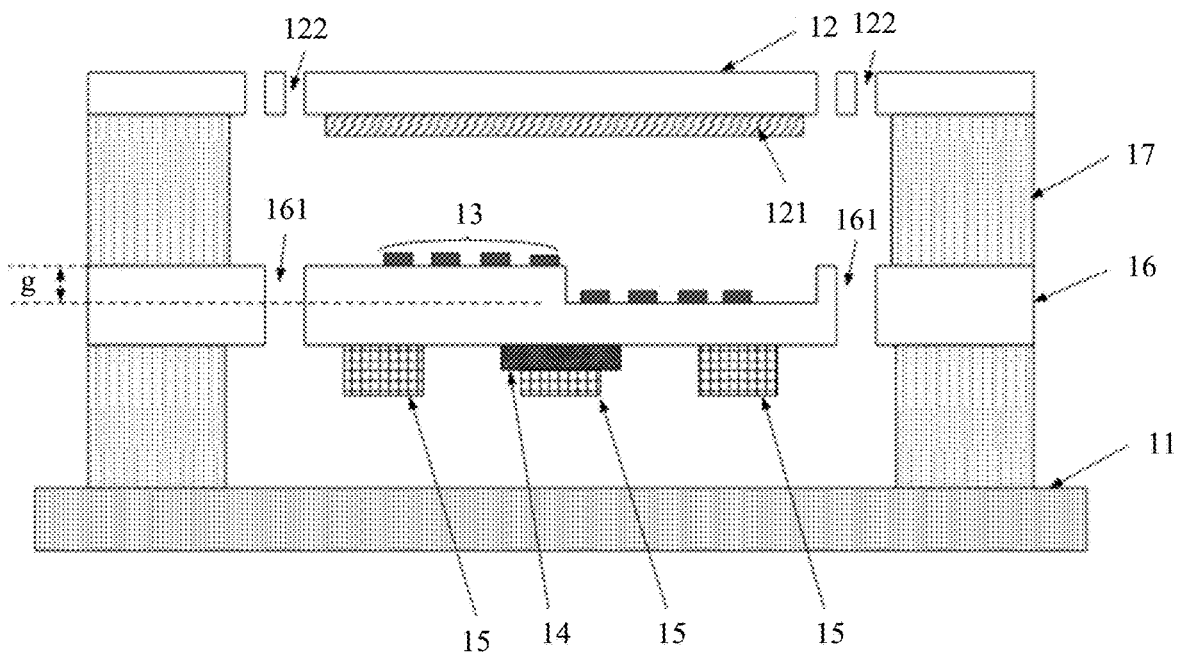

In a fourth optional manner, as shown in FIG. 21, the plurality of gratings 13 of the grating group are located on the side that is of the grating base 16 and that is close to the diaphragm 12. The optical emitter 14 and the optical detector 15 are located on the side that is of the grating base 16 and that is away from the diaphragm 12. In other words, the grating group, the optical emitter 14, and the optical detector 15 are located on both sides of the grating base 16, and the optical emitter 14 and the optical detector 15 are located on the same side of the grating base 16. In this way, the light emitted by the optical emitter 14 can reach the grating only after passing through the grating base 16, and a distance between the optical emitter 14 and the grating base 16 is relatively short. On a premise that a divergence angle of the optical emitter 14 is ensured, disposition of the components is more compact, and a distance between the substrate 11 and the optical emitter 14 and a distance between the substrate 11 and the optical detector 15 may be reduced, to reduce the overall thickness of the microphone chip, and implement miniaturization of the microphone chip.

For a principle of the microphone chip in the fourth optional manner, refer to the working principle of the foregoing three optional manners. Details are not described again in this embodiment of this application.

In this embodiment of this application, the support structure 17 may be implemented in a plurality of manners, as long as it is ensured that the grating base 16 is effectively fastened between the substrate 11 and the diaphragm 12.

In a first optional implementation, the support structure 17 may include a plurality of pillar structures such as a photo spacer (PS), and two ends of each pillar structure (namely, ends in which two parallel surfaces are located) are respectively firmly connected to the substrate 11 and the diaphragm 12. The plurality of pillar structures may be evenly distributed around edges of the substrate 11 and the diaphragm 12, to effectively support the substrate 11 and the diaphragm 12.

In a second optional implementation, the support structure 17 is a ring structure, in other words, the support structure 17 is ring-shaped when the structure is viewed from the top, and two ends of the support structure 17 are respectively firmly connected to the substrate 11 and the diaphragm 12. The support structure 17 may be distributed around the edges of the substrate 11 and the diaphragm 12, and the support structure 17, the substrate 11 and the diaphragm 12 form a cavity in which the grating group, the optical emitter, and the optical detector are disposed, to effectively support the substrate 11 and the diaphragm 12. The cavity is a sealed cavity. This can block dust from the outside and prolong a service life of the microphone chip. For example, the support structure may be made by using sealant.

It should be noted that the support structure may alternatively be another support structure, for example, a hollowedout support bracket (which can implement good heat dissipation of the microphone chip). This is not limited in this application.

In this embodiment of this application, the grating base 16 may be fastened on the support structure 17 in a plurality of manners.

In an optional implementation, as shown in FIG. 16, a side surface of the support structure 17 is provided with a clamping slot, and an edge of the grating base 16 may be inserted into the clamping slot, to be firmly connected to the support structure 17. For example, the support structure 17 may be provided with a plurality of clamping slots, and the plurality of clamping slots correspond to at least two sides of the support structure 17 (for example, at least two sides of the front, rear, left, and right sides when the support structure 17 is placed horizontally). In this way, the grating base 16 is more firmly clamped into the support structure 17. For example, if the support structure 17 is the support structure in the foregoing first optional implementation, clamping slots are disposed on side surfaces that are of one or more of the plurality of pillar structures and that face the grating base. If the support structure 17 is the support structure in the foregoing second optional implementation, clamping slots are disposed on one or more inner surfaces of the support structure 17.

In another optional implementation, as shown in FIG. 17, the support structure 17 includes two parts: an upper support 171 and a lower support 172, and the edge of the grating base 16 may be clamped between the upper support 171 and the lower support 172, to be firmly connected to the support structure 17. For example, if the support structure 17 is the support structure in the foregoing first optional implementation, each of the plurality of pillar structures is divided into an upper part and a lower part. The upper support 171 includes upper parts of the plurality of pillar structures, and the lower support 172 includes lower parts of the plurality of pillar structures. If the support structure 17 is the support structure in the foregoing second optional implementation, the support structure 17 is divided into an upper part and a lower part, the upper support 171 is the upper part of the support structure 17, and the lower support 172 is the lower part of the support structure 17.

In still another optional implementation, as shown in FIG. 18, the edge of the grating base 16 may be firmly connected to the support structure 17 through bonding (to be specific, by using glue or adhesive).

Figure 22:
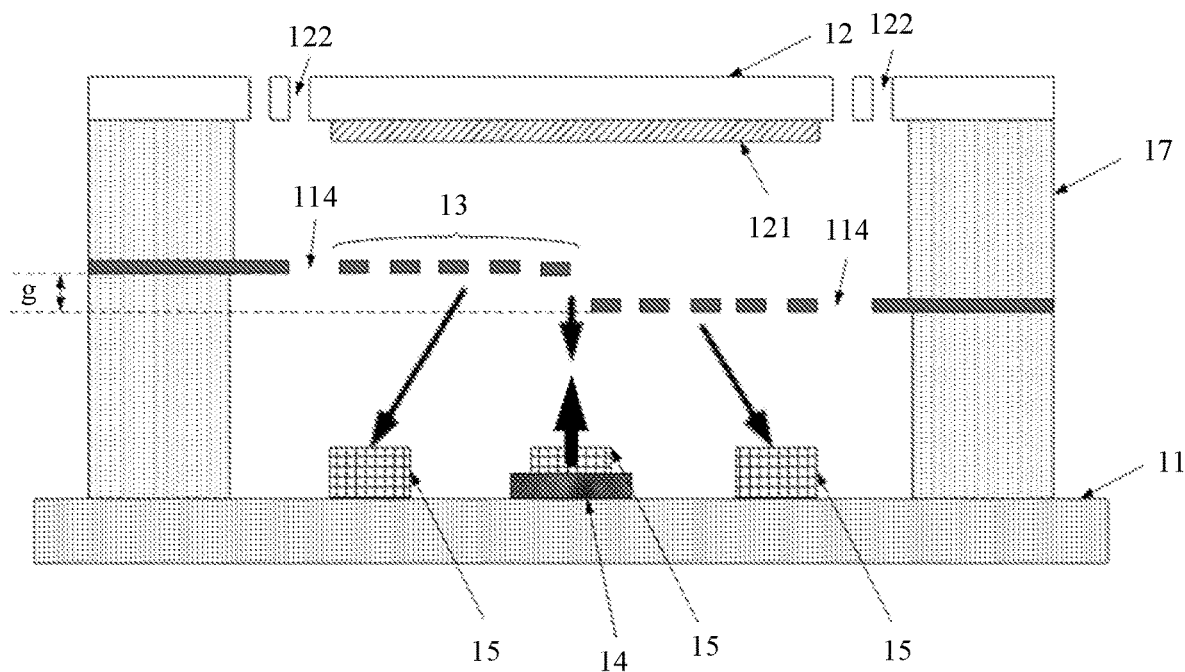

In a second implementation, the grating group is fastened between the substrate and the diaphragm by using a support structure. As shown in FIG. 22, the microphone chip 1 further includes:

a support structure 17, where the support structure 17 is fastened between the substrate 11 and the diaphragm 12; and each grating 13 is fastened on the support structure 17.

For a structure and a material of the support structure 17, refer to the structure and the material of the support structure 17 in the foregoing embodiment. For a manner in which the grating 13 is fastened on the support structure 17, refer to the manner in which the grating base 16 is fastened on the support structure 17 in the foregoing embodiment. Details are not described again in this embodiment of this application. A fixed connection between the grating group and the support structure may be implemented by using micromachining and micro-assembly processes.

Figure 23:
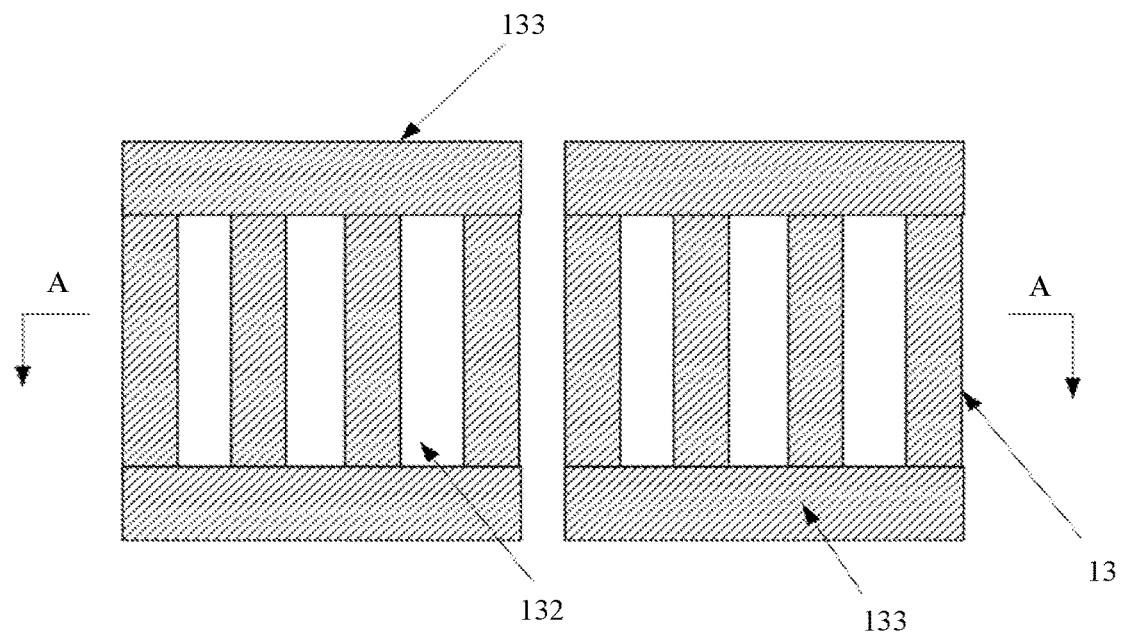
FIG. 23 and FIG. 24 are top-view schematic diagrams of other two grating groups according to an embodiment of this application.
Figure 24:
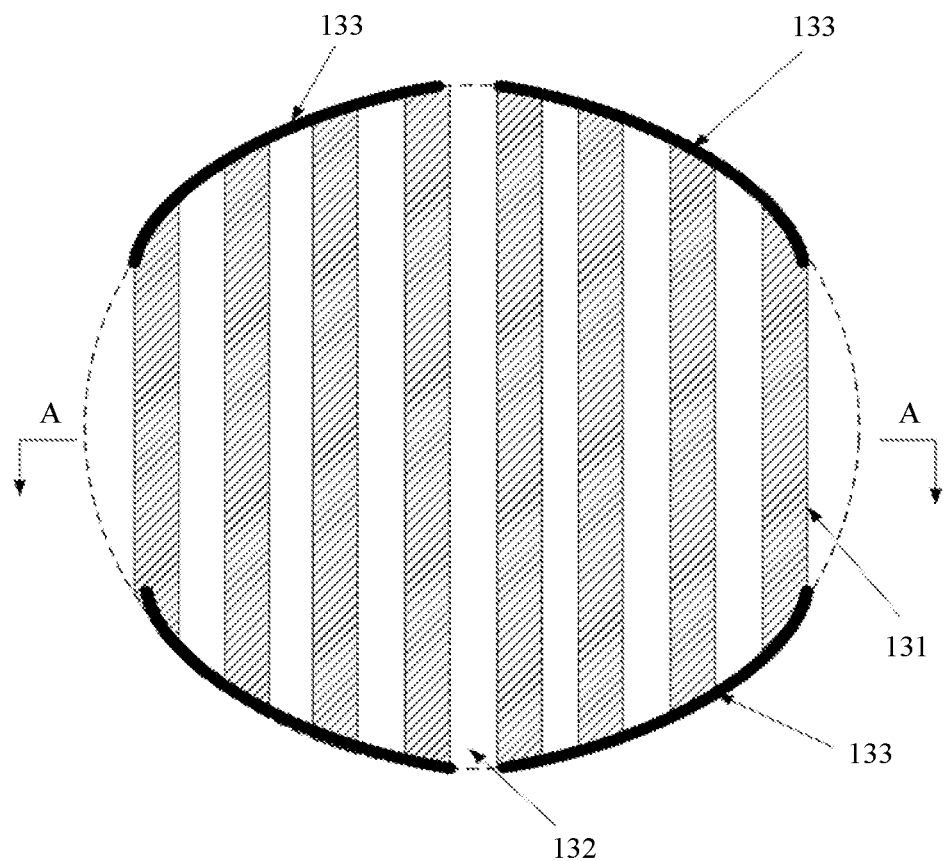

In an optional example, when a grating base is used to carry the grating group, a structure of the grating group may be shown in FIG. 3 and FIG. 4, and all grating bars of each grating may be disposed at an interval, and are not connected to each other. After the grating base is no longer disposed, a structure of each grating in the grating group may be shown in FIG. 23 and FIG. 24. In addition to slits 131 and grating bars 132, the grating further includes a connection bar 133 connected to the grating bars 132, and the connection bar 133 may be a linear connection bar. Alternatively, the connection bar may be a non-linear connection bar, for example, a curved connection bar. The connection bar 133 is used to ensure that the grating bars in the grating are connected, thereby fixing the grating bars. When the grating 13 is fastened on the support structure 17 in a fixed manner shown in FIG. 19 or FIG. 20, at least a side on which the connection bar 133 is located may be fastened on the support structure 17. In both FIG. 23 and FIG. 24, an example in which the grating group includes two gratings is used for description, but a quantity of gratings in the grating group is not limited. In addition, for schematic diagrams of cross-sections A-A of the grating groups shown in FIG. 23 and FIG. 24 and in a similar grating group, refer to the foregoing FIG. 5 to FIG. 15. Details are not described again in this embodiment of this application.

In another optional example, each grating may be made by etching (for example, laser etching) on a transparent sheet-like structure, for example, a glass sheet, to obtain a plurality of parallel nicks, where the nicks are the foregoing slits, and the foregoing grating bar is located between every two nicks. In this way, each grating is actually a sheet-like structure with the nicks, and may be fastened on the support structure 17 in the manner in which the grating base 16 is fastened on the support structure 17.

It should be noted that, in the foregoing first implementation, mechanical noise is introduced to the grating base due to an air damping phenomenon. The air damping phenomenon refers to a physical phenomenon in which an amplitude of mechanical resonant motion of a component gradually decreases due to air resistance.

In a second implementation, the grating is directly fastened on the support structure without disposing the grating base, and the grating is similar to being suspended between the diaphragm and the substrate, thereby reducing the thickness of the microphone chip and implementing miniaturization of the chip. In addition, because the grating base is not disposed, interaction between the grating base and the air can be avoided, thereby reducing noise caused by the air damping phenomenon.

Figure 25:
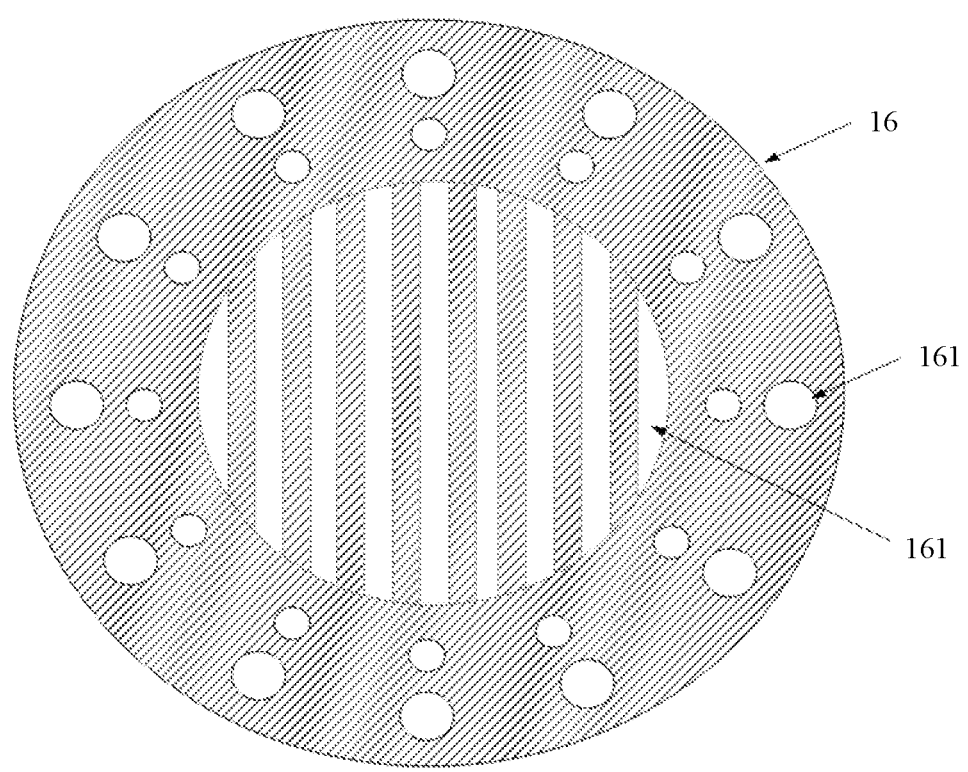
FIG. 25 is a top-view schematic structural diagram of a grating base according to an embodiment of this application.

Further, optionally, as shown in FIG. 17 to FIG. 21, the grating base 16 is provided with a first hole 161. FIG. 25 is a top-view schematic structural diagram of the grating base 16. The grating base 16 is provided with one or a plurality of first holes 161. When the grating base 16 is provided with the plurality of first holes 161, shapes and/or sizes (or areas) of the plurality of first holes 161 may be the same or different. For example, the shapes of the plurality of first holes 161 may include one or more of a circle, a rectangle, a honeycomb shape (namely, a regular hexagon), a triangle, an ellipse, or another irregular shape. In FIG. 25, an example in which the first hole 161 includes two types of holes, namely, a circular hole and a hole of an irregular-stripe shape, is used for description. However, the shape of the first hole is not limited in this embodiment of this application.

A larger quantity of first holes and larger sizes of the first holes indicate less interaction between the grating base 16 and the air, and the air damping phenomenon is correspondingly weakened. Therefore, on a premise that the grating base 16 effectively carries the grating group, more first holes and first holes with larger sizes may be disposed as far as possible. Further, the plurality of first holes 161 may be evenly distributed on the grating base, for example, the first holes 161 are centrally symmetrically distributed or axially symmetrically distributed. In this way, it can be ensured that force of the grating base is even and a life of the grating base is prolonged.

It should be noted that a shape and/or a size of a boundary of the grating base (for example, a boundary of orthographic projection of the grating base on the substrate) needs to match the grating group, so that the grating base can effectively carry the grating group. For example, the shape of the grating base may be the same as the shape of the boundary of the grating group. For example, when the shape of the boundary of the grating group is shown in FIG. 4, the shape of the boundary of the grating base is shown in FIG. 25, and the shapes of the two are circular. The size of the boundary of the grating base may be greater than or equal to a size of the boundary of the grating group, to ensure that an area in which the grating group is orthographically projected on the substrate is located in an area in which the grating base is orthographically projected on the substrate. For example, when the boundary of the grating base and the boundary of the grating group are circular, a diameter of a circle corresponding to the grating base is greater than a diameter of a circle corresponding to the grating group.

Figure 26:
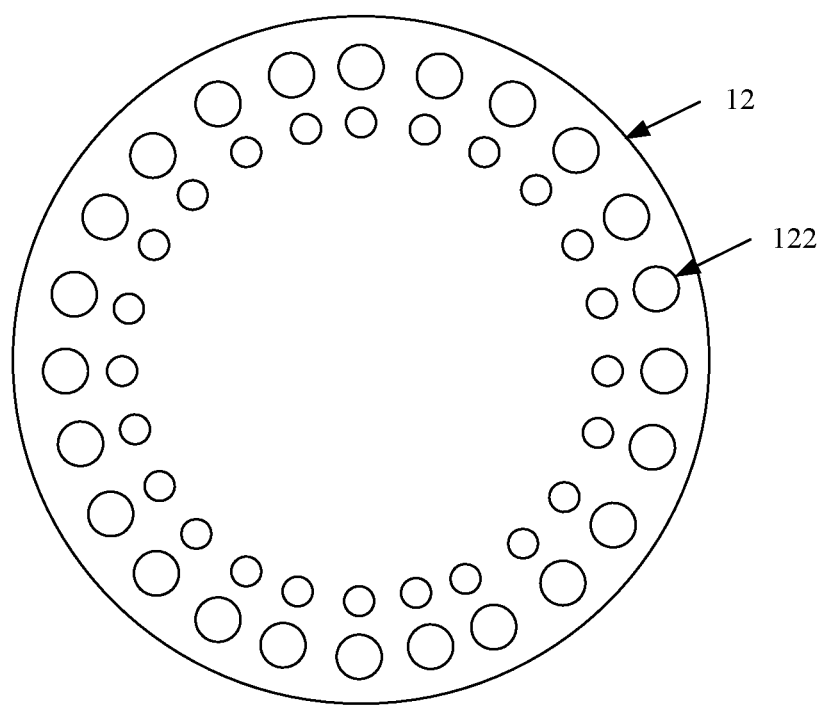
FIG. 26 is a top-view schematic structural diagram of a diaphragm according to an embodiment of this application.

Optionally, as shown in FIG. 18 to FIG. 22, the diaphragm 12 is provided with a second hole 122, to reduce the noise caused by the air damping phenomenon. FIG. 26 is a top-view schematic structural diagram of the diaphragm 12.

The diaphragm 12 is provided with one or a plurality of second holes 122. When the diaphragm 12 is provided with the plurality of second holes 122, shapes and/or sizes (or areas) of the plurality of second holes 122 may be the same or different. For example, the shapes of the plurality of second holes 122 may include one or more of a circle, a rectangle, a triangle, an ellipse, or another irregular shape. In FIG. 26, an example in which the second hole 122 is a circular hole is used for description. However, the shape of the second hole is not limited in this embodiment of this application.

A larger quantity of second holes and larger sizes of the second holes indicate less interaction between the diaphragm 12 and the air, and the air damping phenomenon is correspondingly weakened. Therefore, on a premise that the reflector is effectively fastened on the diaphragm 12, more second holes and second hole with larger sizes may be disposed as far as possible. Further, the plurality of second holes 122 may be evenly distributed on the diaphragm 12, for example, the second holes 122 are centrally symmetrically distributed or axially symmetrically distributed. In this way, it can be ensured that force of the diaphragm 12 is even and a life of the diaphragm 12 is prolonged. Because the reflector is generally located in the middle of the diaphragm 12, the second holes 122 are generally distributed at the edge of the diaphragm 12.

For example, when the plurality of second holes 122 are disposed on the diaphragm 12, sizes of at least two second holes 122 are different, and/or shapes of the at least two second holes 122 are different. The sizes and the shapes of the plurality of second holes 122 may be obtained through simulation by using simulation software, may be set based on experience of an expert, or may be obtained based on an actual requirement or through theoretical calculation.

The diaphragm of the conventional microphone chip is not provided with a hole. If the diaphragm is not provided with the hole, sensitivity of the microphone chip deteriorates as atmospheric pressure increases, and the microphone chip is easily damaged when a difference between pressure inside a cavity and pressure outside the cavity is excessively large. In this embodiment of this application, the hole is drilled on the diaphragm, so that air damping is reduced, the mechanical noise is reduced, and the signal-to-noise ratio of the microphone is improved. In addition, atmospheric pressure inside the cavity and atmospheric pressure outside the cavity is communicated, so that stress of the diaphragm can be released to some extent.

In addition, because the thickness of the diaphragm 12 is generally relatively thin, the second hole 122 may be disposed on the diaphragm 12 according to a micro-perforation sound absorption theory, to implement a sound absorption effect of the diaphragm.

The micro-perforation sound absorption theory refers to disposing a micro-hole (also referred to as a micro-perforation hole) with a diameter less than 1.0 mm on a thin film (or a plate structure) whose thickness is less than 1.0 mm, and a hole drilling rate (for example, a ratio of a sum of areas of the holes to an overall area of the thin film) is generally from 1% to 5%. In other words, a total area of the second holes on the diaphragm accounts for 1% to 5% of a total area of the diaphragm. An air layer with specific thickness (for example, 5 cm to 20 cm (cm)) is reserved on one side of the thin film, to form a micro-perforation sound absorption structure. The structure is a resonant high acoustic resistance structure with a sound absorption characteristic.

According to the micro-perforation sound absorption theory, the hole is drilled on the diaphragm. If the quantity and diameters of the second holes obtained through hole drilling are proper, the formed second hole is equivalent to the foregoing micro-hole, and has a sound absorption effect on high-frequency sound. A smaller size of the second hole indicates a higher frequency of absorption. In this way, high-frequency noise in the environment in which the microphone chip is located can be effectively filtered out.

For example, a size range of the second hole on the diaphragm may be 1 μm to 200 μm (micron). When there are the plurality of second holes on the diaphragm, a combination of second holes of different sizes may increase an absorption frequency width (also referred to as a sound absorption bandwidth), thereby implementing filtering of high-frequency noise of a plurality of frequencies and expanding a filtering range of noise. The sound absorption effect is implemented by disposing the second holes on the diaphragm. This is an effective noise reduction method, and can improve the sensitivity, the signal-to-noise ratio, and a dynamic range of the microphone chip.

For example, it is assumed that the microphone sensor is used to pick up human voice, and a human voice frequency ranges from 20 Hz (Hz) to 20 kHz (kHz). Therefore, noise higher than the 20 kHz needs to be filtered out. A plurality of second holes with a fixed diameter of 10 μm or 20 μm may be disposed, to implement filtering of the noise higher than the 20 kHz. Further, a combination of a plurality of second holes with a diameter ranging from 10 μm to 20 μm may be used to filter the noise higher than the 20 kHz, for example, a combination of second holes with a diameter of 10 μm and a diameter of 20 μm. In this way, the sound absorption bandwidth of the diaphragm is greatly increased and the sound absorption effect on the high-frequency sound is better.

In this embodiment of this application, a shape of the diaphragm 12 may be various shapes such as a circle, a rectangle, a triangle, or another irregular shape, as long as slight deformation can be generated, to implement sound pickup performance of the microphone chip.

For example, the diaphragm 12 is a circular diaphragm. When the shape of the diaphragm is circular, the diaphragm occupies a relatively small space area relative to a diaphragm whose shape is another shape, so that miniaturization of the microphone chip can be ensured. In addition, when the circular diaphragm is subject to the force, the stress around the circular diaphragm is even, the circular diaphragm is not easy to break, and a service life of the circular diaphragm is long. This can ensure stability of performance of the microphone chip.

Further, optionally, as shown in FIG. 22, when the grating 13 includes a plurality of slits and a peripheral area surrounding the plurality of slits, a third hole may be disposed on the peripheral area, to reduce the noise caused by the air damping phenomenon. The peripheral area is an area that is located at an edge of the grating and that does not affect the diffraction and phase interference functions of the grating. For example, in some scenarios, if the grating is the grating in the grating group shown in FIG. 23 or FIG. 24, and when the grating includes the connection bar, the peripheral area is an area in which the connection bar 133 is located, and the third hole may be disposed on the connection bar 133; or when the grating is obtained by etching the nicks on the transparent sheet-like structure, for example, the glass sheet, the peripheral area is a peripheral area that surrounds the plurality of nicks on the transparent sheet-like structure, and the third hole may be disposed on the periphery. When the grating base having the first holes is disposed on the microphone chip, some or all of third holes may communicate with the first holes, to reduce blocking of the grating on the first holes. It should be noted that, in other scenarios, the size of the grating is relatively small, in other words, the grating has no or almost no peripheral area. In the grating in the grating group shown in FIG. 3 and FIG. 4, the hole does not need to be disposed on the grating.

When the grating 13 is provided with a plurality of third holes, shapes and/or sizes (or areas) of the plurality of third holes may be the same or different. For example, the shapes of the plurality of third holes may include one or more of a circle, a rectangle, a triangle, an ellipse, or another irregular shape. For the shape of the third hole, refer to the shapes of the first hole and the third hole. For example, for a top-view schematic structural diagram of the grating 13, refer to the top-view schematic structural diagram of the grating base in FIG. 25.

Similarly, a larger quantity of third holes and larger sizes of the third holes indicates less interaction between the grating 13 and the air, and the air damping phenomenon is correspondingly weakened. Therefore, on a premise that performance of the grating 13 is ensured, more third holes and third holes of larger sizes may be disposed as far as possible.

Figure 27:
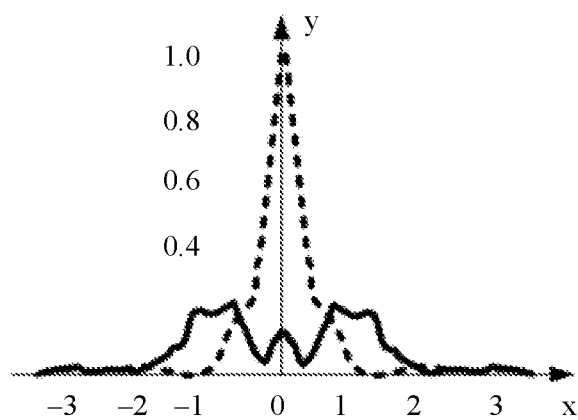
FIG. 27 is a schematic diagram of a relationship between diffracted light intensity and a diffraction order according to an embodiment of this application.

In this embodiment of this application, for a relationship between diffracted light intensity and a diffraction order of a grating, refer to FIG. 27. A horizontal axis indicates a diffraction energy order, and a vertical axis indicates normalized diffracted light intensity. According to a grating diffraction theory, it can be learned that, when a distance between the reflector and a grating is an odd multiple of 214, a phase difference generated by diffracted light passing through the reflector and an upper reflection surface of the grating is $\pi/2$. Refer to a solid curve in FIG. 27. Diffraction energy of the diffraction pattern is mainly concentrated at an order −1 and an order +1. When a distance between the reflector and a grating is an even multiple of $\lambda/4$, a phase difference generated by diffracted light passing through the reflector and an upper reflection surface of the grating is 0. Refer to a dashed curve in FIG. 27. Diffraction energy of the diffraction pattern is mainly concentrated at an order 0. Light intensity at the order −1 and light intensity at the order +1 are 0. It should be noted that the foregoing grating group is equivalent to a special grating, and for a curve of a relationship between diffracted light intensity and a diffraction order of the grating group, refer to FIG. 27.

It can be seen from this that, when a distance between each grating and the reflector is an integer multiple of $\lambda/4$, for each grating, if the diffracted light intensity of the grating is concentrated at the order 0 (that is, maximum light intensity appears at the order 0) or concentrated at the order −1 and the order +1 (that is, the maximum light intensity appears at the order −1 and the order +1), the diffracted light intensity of the grating group is concentrated at the order 0 and/or at the order −1 and the order +1. When a distance between the reflector and a grating is not the integer multiple of $\lambda/4$, for example, when the difference g between the distances between the at least two gratings in the plurality of gratings and the reflector is the odd multiple of $\lambda/8$, a curve of a relationship between diffracted light intensity and a diffraction order is equivalent to a curve formed through weighted superposition of the solid curve and the dashed curve in FIG. 27. Diffraction energy is mainly concentrated at the order 0 and at the order −1 and the order +1. In some cases, the diffraction energy is alternatively partially distributed at an order −3 and an order +3.

In this embodiment of this application, quantities and disposing locations of the optical reflector and the optical detector need to be determined based on the relationship between the diffracted light intensity and the diffraction order. In an optional manner, a target location of the optical receiver may be obtained through calculation by using a grating equation based on one or more of the following parameters: a location of the optical emitter, a light emitting angle of the optical emitter, a location of the reflector, and a location of the grating group. In another optional manner, the target location of the optical receiver may be obtained through simulation by using the simulation software based on one or more of the following parameters: the location of the optical emitter, the light emitting angle of the optical emitter, the location of the reflector, and the location of the grating group. When there is at least one target location, the optical detector is disposed at one or more target locations. Light intensity at the target location is greater than a specified light intensity threshold, for example, the specified light intensity threshold is 0, generally, the target location is locations corresponding to the order −3, the order −1, the order 0, the order +1, and the order +3.

For any grating in the grating group, a grating equation that the grating satisfies is $d(\sin \alpha + \sin \beta) = c\lambda$, where $\lambda$ is the wavelength of the light emitted by the foregoing optical emitter, d is a spacing between the slits of the grating, and is also referred to as a grating constant, $\alpha$ is an incidence angle of the light emitted by the optical emitter on the grating, $\beta$ is a grating diffraction angle, c is an integer, and a value of c is −2, −1, 0, +1, +2, . . . , and so on.

As shown in FIG. 1, FIG. 16, FIG. 18, and FIG. 20 to FIG. 22, there may be one optical emitter. As shown in FIG. 17 and FIG. 19, there may be two or more optical emitters. Wavelengths of the optical emitters may be the same or different. Similarly, there may be one optical receiver, two optical receivers, three optical receivers (as shown in FIG. 1, FIG. 16, and FIG. 18 to FIG. 22), four optical receivers, five optical receivers, six optical receivers (FIG. 17), or the like.

In an example, as shown in FIG. 18 or FIG. 22, the microphone chip includes one optical emitter 14 and three optical detectors 15. The three optical detectors 15 are separately configured to receive diffracted light at the order −1, diffracted light at the order 0 and diffracted light at the order +1 that are diffracted by the grating group. In this way, light intensity detection sensitivity is relatively high when light intensity detection is performed when the diffraction energy is concentrated at the order 0, the order −1, and the order +1. A combination of the optical emitter and the optical detector shown in FIG. 18 or FIG. 22 can be effectively adapted to this application scenario.

In another example, as shown in FIG. 17, the microphone chip includes two optical emitters 14 and six optical detectors 15. The six optical detectors 15 are separately configured to receive diffracted light at the order −3, diffracted light at the order −1, diffracted light at the order 0, diffracted light at the order 0, diffracted light at the order +1, and diffracted light at the order +3 that are diffracted by the grating group.

In still another example, the microphone chip includes two optical emitters 14 and five optical detectors 15. The five optical detectors 15 are separately configured to receive diffracted light at the order −3, diffracted light at the order −1, diffracted light at the order 0, diffracted light at the order +1, and diffracted light at the order +3 that are diffracted by the grating group.

In this embodiment of this application, when two optical emitters and a plurality of optical receivers are used, a receiving effect of the diffracted light intensity can be improved, and detection sensitivity can be improved.

It can be learned according to the grating diffraction theory and FIG. 27 that diffracted light intensity at an order −5, an order +5, and at higher orders is very weak. Generally, the optical detector is used to receive the diffracted light intensity at the order −3, the order −1, the order 0, the order +1, and the order +3, to save the manufacturing costs of the microphone chip.

In this embodiment of this application, the wavelength $\lambda$ of the light emitted by the optical emitter may be defined differently in different application scenarios. In one case, when the microphone chip includes one optical emitter, the wavelength $\lambda$ of the light emitted by the optical emitter is equal to a wavelength of light emitted by the optical emitter. In another case, when the microphone chip includes a plurality of optical emitters, and wavelengths of light emitted by the plurality of optical emitters are equal, the wavelength $\lambda$ of the light emitted by the optical emitter is equal to the wavelength of the light emitted by any one of the plurality of optical emitters. In still another case, when the microphone chip includes a plurality of optical emitters, and light emitted by the plurality of optical emitters has a plurality of wavelengths, the wavelength $\lambda$ of the light emitted by the optical emitters is equal to a multiplexed wavelength of the plurality of wavelengths.

It is assumed that the light emitted by the plurality of emitters has k wavelengths, which are respectively $\lambda_1$ to $\lambda_k$, and k is an integer greater than 1. The wavelength $\lambda$ of the light emitted by the optical emitter meets a formula of a multiplexed wavelength:

$$\lambda = \max\left(\frac{\lambda_i \times \lambda_j}{|\lambda_i - \lambda_j|}\right).$$

where max means obtaining a maximum value; i≠j, i∈ [1,k], and j∈ [1,k].

That is, the multiplexed wavelength $\lambda$ is the maximum value of multiplexed wavelengths of every two of the k wavelengths.

For example, when the microphone chip includes two optical emitters 14, wavelengths of light emitted by the two optical emitters 14 are respectively $\lambda_1$ and $\lambda_2$, and the two wavelengths are different. In this case, $\lambda$ satisfies a wavelength formula:

$$\lambda = \frac{\lambda_1 \times \lambda_2}{|\lambda_1 - \lambda_2|}.$$

Detection ranges of the two wavelengths are increased from $\lambda_1/4$ or $\lambda_2/4$ of a single wavelength to $\lambda/4$. Maximum detection sensitivity is h=$\lambda/8$, where h is the distance between the reflector and the grating. The two wavelengths are set, so that a detection point with low detection sensitivity can be avoided, the linear working area of the microphone chip can be enlarged, and a measurement range of the microphone chip can be enlarged within a specific range.

In addition, when the wavelengths of the light emitted by the two optical emitters with different emission wavelengths are close, for example, a difference between $\lambda_1$ and $\lambda_2$ is less than 1, a larger multiplexed wavelength $\lambda$ is obtained by using the foregoing wavelength formula. Generally, a larger wavelength of light emitted by one optical emitter indicates relatively higher manufacturing costs. Therefore, the two optical emitters with relatively small wavelengths are used to obtain the relatively large multiplexed wavelength $\lambda$, and an optical emitter with a relatively large wavelength does not need to be directly disposed, thereby reducing the manufacturing costs of the microphone chip.

It should be noted that FIG. 16 to FIG. 22 in this embodiment of this application are cross-sectional views of the microphone chip. In the FIG. 16 to FIG. 22, the optical emitter and the optical detector are deployed in a same horizontal direction, but substantially, the optical emitter and the optical detector are slightly staggered, and do not overlap and block each other. For example, a top-view shape of the optical emitter is a zigzag (namely, a ring), and the optical emitter is disposed around the optical detector, or the optical emitter and the optical detector are disposed adjacently. The figure is merely schematically drawn. This is not limited in this embodiment of this application.

Figure 28:
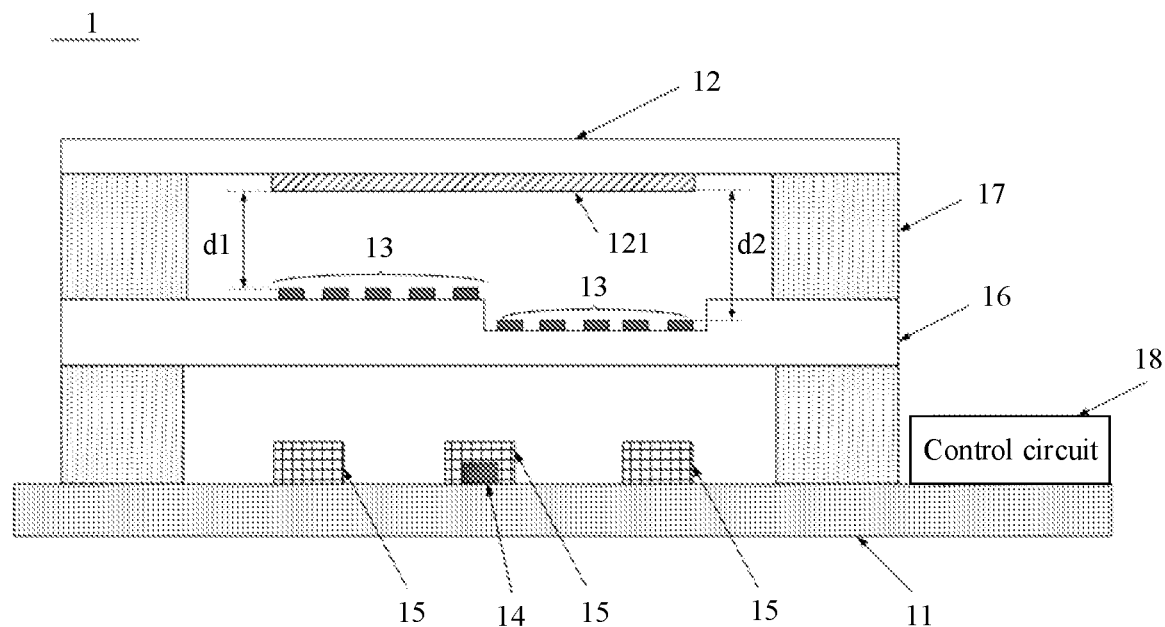
FIG. 28 is a schematic structural diagram of another microphone chip according to an embodiment of this application.

Optionally, as shown in FIG. 28, the microphone chip 1 further includes:

a control circuit 18, where the control circuit 18 may be electrically connected to the optical emitter 14, and is configured to control the optical emitter 14 to emit light. For example, the control circuit 18 may be located on the substrate 11.

Further, the microphone chip 1 may further include a driving circuit. The driving circuit may be electrically connected to the optical emitter 14, and is configured to drive the optical emitter 14 to emit light. The driving circuit may be located on the substrate 11.

Further, the microphone chip 1 may further include a receiving circuit. The receiving circuit may be electrically connected to the optical detector 15, and is configured to receive a signal output by the optical detector 15. The receiving circuit may be located on the substrate 11.

It should be noted that, other optical elements such as a reflector or a prism may be further disposed in the microphone chip based on a specific function, to adjust an optical path.

In conclusion, according to the microphone chip provided in this embodiment of this application, the distances between the at least two gratings in the plurality of gratings and the reflector are different. Therefore, a change in the distance between the reflector and the grating can be implemented without disposing the driving structure and the driving control circuit. The structure is simple. Further, because the driving structure and the driving control circuit are not disposed, the difficulty and the complexity of the manufacturing process are reduced, and the mechanical noise and the circuit noise are reduced. Therefore, the sound pickup performance of the microphone chip is effectively improved.

When the difference g of the distances between the at least two gratings in the plurality of gratings and the reflector is the odd multiple of $\lambda/8$, on the basis of the simplified structure, the difficulty of the manufacturing process is reduced, and it is ensured that the microphone chip is stably located in the linear working area, thereby improving the detection sensitivity and the signal-to-noise ratio of the microphone.

Figure 29:
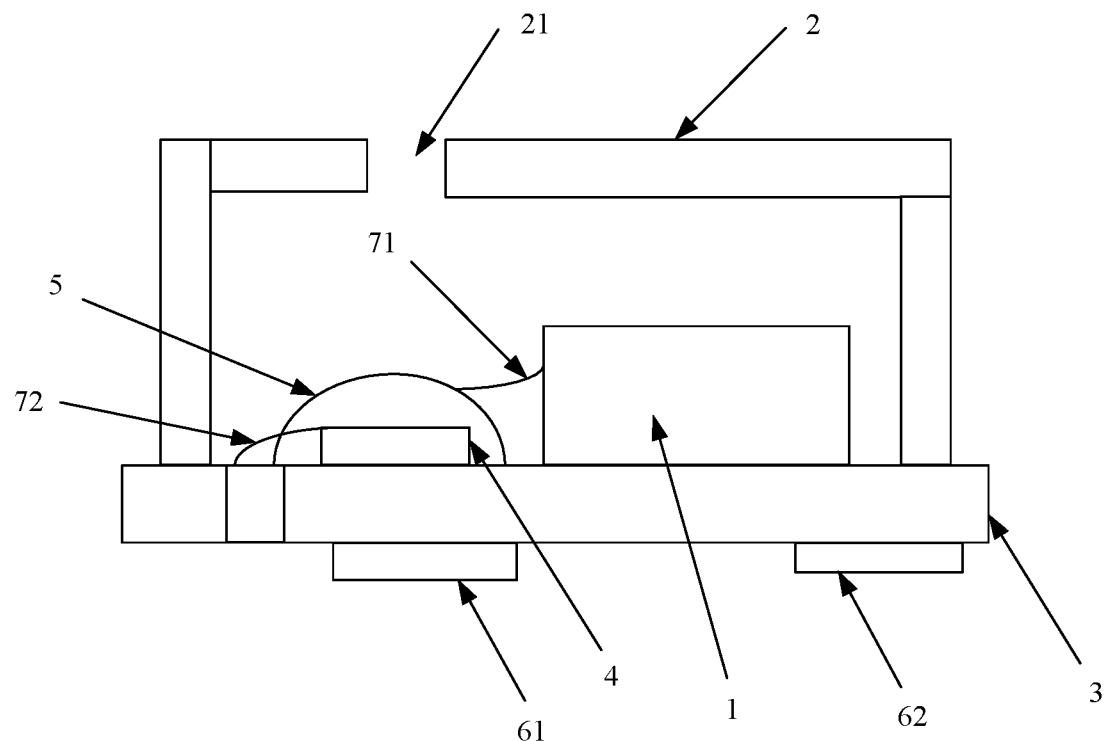
FIG. 29 is a schematic structural diagram of a microphone according to an embodiment of this application.

An embodiment of this application provides a microphone. As shown in FIG. 29, the microphone includes the microphone chip 1 provided in any one of the foregoing embodiments of this application and a packaging structure 2 of the microphone chip 1.

Further, optionally, the microphone may further include a main board 3, and both the microphone chip 1 and the packaging structure 2 are disposed on the main board.

For example, the packaging structure 2 may be a housing, and the packaging structure 2 is provided with a sound inlet hole 21, so that a sound signal passes through the sound inlet hole 21 and enters the microphone chip 1 after passing through the housing.

The microphone may further include a processing chip 4, a packaging body 5 of the processing chip, a signal importing connection point (pad) 61 for importing a signal to the processing chip 4, and a signal exporting connection point 62 for exporting a signal from the processing chip 4. The packaging 5 may be insulation glue. The microphone chip 1 is electrically connected to the processing chip 4 through a signal line 71, and the processing chip 4 is electrically connected to the signal importing connection point 61 through a signal line 72. For example, the processing chip 4 may be an application-specific integrated circuit (ASIC) chip.

The main board may be a PCB. The substrate of the microphone chip 1 and the main board may be of an integral structure, in other words, the substrate is the main board. The sound inlet hole 21 and the microphone chip 1 are staggered, in other words, orthographic projection of the sound inlet hole 21 on the main board and orthographic projection of the microphone chip 1 on the main board do not overlap. In this way, contaminant of an external environment can be prevented from entering the microphone chip, thereby improving a service life of the microphone chip.

It should be noted that, other optical elements such as a reflector or a prism may be further disposed outside the microphone chip in the microphone based on a specific function, to adjust an optical path.

The microphone provided in this embodiment of this application may be used as an independent microphone, or may be used in scenarios in which a long-distance high-fidelity human voice needs to be picked up such as an intelligent speaker scenario, an automatic driving scenario, and a human-computer interaction scenario in fields such as the Internet of Things, the Internet of Vehicles, and a robot.

The microphone provided in this embodiment of this application can be used to effectively improve detection sensitivity of the optical microphone, thereby improving performance such as a signal-to-noise ratio and a dynamic range of the optical microphone.

An embodiment of this application provides a terminal device, including the microphone provided in the foregoing embodiment of this application. For example, the terminal device may be used in scenarios such as an intelligent speaker scenario, an automatic driving scenario, and a human-computer interaction scenario in a field, for example, the Internet of Things, the Internet of Vehicles, or a robot.

Figure 30:
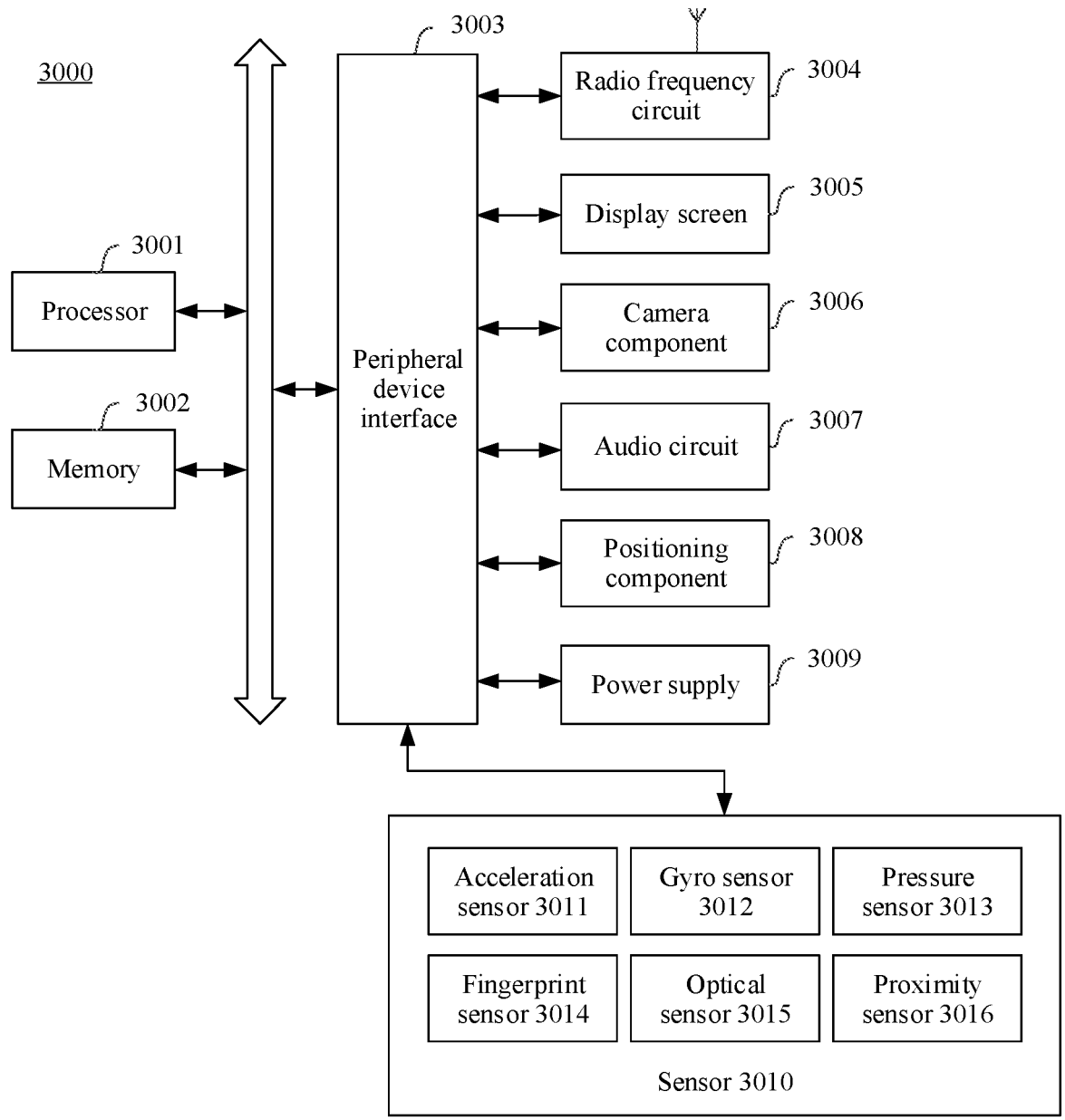
FIG. 30 is a schematic structural diagram of a terminal device according to an embodiment of this application.

FIG. 30 is a structural block diagram of a terminal device 3000 according to an example embodiment of this application. The terminal device 3000 may be a smartphone, a tablet computer, an MP3 player (Moving Picture Experts Group Audio Layer III, moving picture experts group audio layer 3), an MP4 player (Moving Picture Experts Group Audio Layer IV, moving picture experts group audio layer 4), a laptop, or a desktop computer. The terminal device 3000 may also be referred to as another name, for example, user equipment, a portable terminal device, a laptop terminal device, or a desktop terminal.

Generally, the terminal device 3000 includes a processor 3001 and a memory 3002.

The processor 3001 may include one or more processing cores, for example, the processor 3001 may be a 4-core processor or an 8-core processor. The processor 3001 may be implemented in at least one hardware form of a Digital Signal Processor (DSP), a Field-Programmable Gate Array (FPGA), or a Programmable Logic Array (PLA). The processor 3001 may alternatively include a main processor and a coprocessor. The main processor is a processor configured to process data in a wakeup state, and is also referred to as a Central Processing Unit (CPU). The coprocessor is a low-power-consumption processor configured to process data in a standby state. In some embodiments, a Graphics Processing Unit (GPU) may be integrated into the processor 3001, and the GPU is configured to perform rendering of content that needs to be displayed on a display screen. In some embodiments, the processor 3001 may further include an Artificial Intelligence (AI) processor. The AI processor is configured to process a computing operation related to machine learning.

The memory 3002 may include one or more computer-readable storage media, where the computer-readable storage media may be in a non-transient state. The memory 3002 may further include a high-speed random access memory and a non-volatile memory, for example, one or more magnetic disk storage devices or flash memory storage devices. In some embodiments, the non-transient computer-readable storage medium in the memory 3002 is configured to store at least one instruction.

In some embodiments, the terminal device 3000 may further include a peripheral device interface 3003 and at least one peripheral device. The processor 3001, the memory 3002, and the peripheral device interface 3003 may be connected through a bus or a signal cable. Each peripheral device may be connected to the peripheral device interface 3003 through the bus, the signal cable, or by using a circuit board. Specifically, the peripheral device includes at least one of a radio frequency circuit 3004, a touch display screen 3005, a camera component 3006, an audio circuit 3007, a positioning component 3008, and a power supply 3009.

The peripheral device interface 3003 may be configured to connect at least one peripheral device related to I/O (Input/Output, input/output) to the processor 3001 and the memory 3002. In some embodiments, the processor 3001, the memory 3002, and the peripheral device interface 3003 are integrated on a same chip or a same circuit board. In some other embodiments, any one or two of the processor 3001, the memory 3002, and the peripheral device interface 3003 may be implemented on a separate chip or a separate circuit board. This is not limited in this embodiment.

The radio frequency circuit 3004 is configured to receive and transmit a Radio Frequency (RF) signal. The RF signal is also referred to as an electromagnetic signal. The radio frequency circuit 3004 communicates with a communication network and another communication device by using the electromagnetic signal. The radio frequency circuit 3004 converts an electrical signal into the electromagnetic signal for transmission, or the radio frequency circuit converts the received electromagnetic signal into an electrical signal. Optionally, the radio frequency circuit 3004 includes an antenna system, an RF transceiver, one or more amplifiers, a tuner, an oscillator, a digital signal processor, a codec chip group, a subscriber identity module card, and the like. The radio frequency circuit 3004 may communicate with another terminal device by using at least one wireless communication protocol. The wireless communication protocol includes but is not limited to a metropolitan area network, various generations of mobile communication networks (2G, 3G, 4G and 5G), a wireless local area network, and/or a Wireless Fidelity (Wi-Fi) network. In some embodiments, the radio frequency circuit 3004 may further include a Near Field Communication (NFC)-related circuit. This is not limited in this application.

The display screen 3005 is configured to display a User Interface (UI). The UI may include graphics, a text, an icon, a video, and any combination thereof. When the display screen 3005 is a touch display screen, the display screen 3005 further has a capability of collecting a touch signal on a surface or above a surface of the display screen 3005. The touch signal may be input into the processor 3001 as a control signal for processing. In this case, the display screen 3005 may be further configured to provide a virtual button and/or a virtual keyboard. The virtual button and/or the virtual keyboard is also referred to as a soft button and/or a soft keyboard. In some embodiments, there may be one display screen 3005 that is disposed on a front panel of the terminal device 3000. In some other embodiments, there may be at least two display screens 3005 that are respectively disposed on different surfaces of the terminal device 3000 or are folded. In still some embodiments, the display screen 3005 may be a flexible display screen, and is disposed on a curved surface or a folded surface of the terminal device 3000. Even, the display screen 3005 may alternatively be set to an irregular shape that is not a rectangle, in other words, the display screen 3005 may be an abnormal-shape screen. The display screen 3005 may be prepared by using materials such as a Liquid Crystal Display (LCD), and an Organic Light-Emitting Diode (OLED).

The camera component 3006 is configured to collect an image or a video. Optionally, the camera component 3006 includes a front-facing camera and a rear-facing camera. Generally, the front-facing camera is disposed on the front panel of the terminal device, and the rear-facing camera is disposed on a rear side of the terminal device. In some embodiments, there are at least two rear-facing cameras, and each of the rear-facing cameras is any one of a main camera, a depth-of-field camera, a wide-angle camera, and a tele-photo camera, to implement convergence of the main camera and the depth-of-field camera, so as to implement a background blur function, and to implement convergence of the main camera and the wide-angle camera, so as to implement a panoramic shooting function, a Virtual Reality (VR) shooting function, or another convergence shooting function. In some embodiments, the camera component 3006 may further include a flash. The flash may be a single-color temperature flash or a dual-color temperature flash. The dual-color temperature flash is a combination of a warm-light flash and a cold-light flash, and the dual-color temperature flash may be configured for light compensation at different color temperatures.

The audio circuit 3007 may include the foregoing microphone 1 and a loudspeaker. The microphone 1 is configured to collect sound waves of a user and an environment, convert the sound waves into electrical signals, and input the electrical signals into the processor 3001. The processor 3001 is configured to process the received electrical signals, and the memory 3002 may store data obtained through processing, to record or store data corresponding to the sound waves. Alternatively, the electrical signals obtained through processing by the microphone 1 may be further input into the radio frequency circuit 3004 to implement voice communication. For purposes of stereo collection or noise reduction, there may be a plurality of microphones, and the microphones are separately disposed at different parts of the terminal device 3000. The microphone may be an array microphone or an omnidirectional-acquisition microphone. The loudspeaker is configured to convert an electrical signal from the processor 3001 or the radio frequency circuit 3004 into a sound wave. The loudspeaker may be a conventional thin-film loudspeaker, or may be a piezoelectric ceramic loudspeaker. When the loudspeaker is the piezoelectric ceramic loudspeaker, the electrical signal may be converted into a sound wave audible to human being, or the electrical signal may be converted into a sound wave inaudible to human being for a ranging purpose. In some embodiments, the audio circuit 3007 may further include a headset jack.

The positioning component 3008 is configured to locate a current geographical location of the terminal device 3000, to implement navigation or a Location Based Service (LBS). The positioning component 3008 may be a positioning component based on a Global Positioning System (GPS) of the United States, a Beidou system of China, a GLONASS system of Russia, or a Galileo system of the European Union.

The power supply 3009 is configured to supply power to each component in the terminal device 3000. The power supply 3009 may include an alternating current, a direct current, a disposable battery, or a rechargeable battery. When the power supply 3009 includes the rechargeable battery, the rechargeable battery may support wired charging or wireless charging. The rechargeable battery can further be used to support a fast charging technology.

In some embodiments, the terminal device 3000 may further include one or more sensors 3010. The one or more sensors 3010 include but are not limited to: an acceleration sensor 3011, a gyro sensor 3012, a pressure sensor 3013, a fingerprint sensor 3014, an optical sensor 3015, and a proximity sensor 3016.

The acceleration sensor 3011 may detect acceleration magnitudes on three coordinate axes of a coordinate system established by using the terminal 3000. For example, the acceleration sensor 3011 may be configured to detect components of a gravity acceleration on the three coordinate axes. The processor 3001 may control, based on a gravity acceleration signal collected by the acceleration sensor 3011, the touch display screen 3005 to display the user interface in a horizontal view or a vertical view. The acceleration sensor 3011 may be further configured to collect game data or motion data of the user.

The gyro sensor 3012 may detect a body direction and a rotation angle of the terminal device 3000, and the gyro sensor 3012 may cooperate with the acceleration sensor 3011 to collect a 3D action of the user on the terminal device 3000. The processor 3001 may implement, based on data collected by the gyro sensor 3012, the following functions: action sensing (for example, changing the UI based on a tilt operation of the user), image stabilization during shooting, game control, and inertial navigation.

The pressure sensor 3013 may be disposed on a side frame of the terminal device 3000 and/or at a lower layer of the touch display screen 3005. When the pressure sensor 3013 is disposed on the side frame of the terminal device 3000, a grip signal performed by the user on the terminal device 3000 may be detected, and the processor 3001 performs left and right hand recognition or a quick operation based on the grip signal collected by the pressure sensor 3013. When the pressure sensor 3013 is disposed at the lower layer of the touch display screen 3005, the processor 3001 controls an operability control on the UI interface based on a pressure operation performed by the user on the touch display screen 3005. The operability control includes at least one of a button control, a scroll bar control, an icon control, and a menu control.

The fingerprint sensor 3014 is configured to collect a fingerprint of the user, and the processor 3001 identifies an identity of the user based on the fingerprint collected by the fingerprint sensor 3014 or the fingerprint sensor 3014 identifies an identity of the user based on the fingerprint collected by the fingerprint sensor. When identifying that the identity of the user is trusted, the processor 3001 authorizes the user to perform a related sensitive operation. The sensitive operation includes unlocking a screen, viewing encrypted information, downloading software, making payment, changing a setting, and the like. The fingerprint sensor 3014 may be disposed on a front surface, a back surface, or a side surface of the terminal device 3000. When a physical button or a vendor logo is disposed on the terminal device 3000, the fingerprint sensor 3014 may be integrated with the physical button or the vendor logo.

The optical sensor 3015 is configured to collect ambient light intensity. In an embodiment, the processor 3001 may control display luminance of the touch display screen 3005 based on the ambient light intensity collected by the optical sensor 3015. Specifically, when the ambient light intensity is relatively high, the display luminance of the touch display screen 3005 is increased. When the ambient light intensity is relatively low, the display luminance of the touch display screen 3005 is decreased. In another embodiment, the processor 3001 may further dynamically adjust a shooting parameter of the camera component 3006 based on the ambient light intensity collected by the optical sensor 3015.

The proximity sensor 3016, also referred to as a distance sensor, is generally disposed on the front panel of the terminal device 3000. The proximity sensor 3016 is configured to collect a distance between the user and the front face of the terminal device 3000. In an embodiment, when the proximity sensor 3016 detects that the distance between the user and the front face of the terminal device 3000 gradually decreases, the processor 3001 controls the touch display screen 3005 to switch from a screen-on state to a screen-off state. When the proximity sensor 3016 detects that the distance between the user and the front face of the terminal device 3000 gradually increases, the processor 3001 controls the touch display screen 3005 to switch from the screen-off state to the screen-on state.

A person skilled in the art may understand that the structure shown in FIG. 12 does not constitute a limitation on the terminal device 3000, and the terminal device 3000 may include more or fewer components than those shown in the figure, or combine some components, or use different component disposition.

Based on a key point of the embodiments of this application and a construction idea of the core modules, the shape of the boundary of the grating group, the shape of the grating, the material of the grating base, the shape of the diaphragm, the material of the diaphragm, the shape of the reflector, the material of the reflector, the distance difference between the gratings, the optical emitter, the optical detector, and the like may be combined in the embodiments of this application. A plurality of solutions for implementing the microphone chip may be formed, to obtain a plurality of embodiments. For example, the grating group is not limited to having two gratings, and may alternatively have three gratings, four gratings, or five gratings, as long as it is ensured that the grating group matches the shape of the spot emitted by the optical emitter (for example, the grating group can cover the spot of the optical emitter in a disposed direction of the optical detector). The diaphragm may be provided with holes, no holes, or holes with different diameters. The cross-sectional shape of the grating bar of the grating may be a rectangle, a triangle, a zigzag shape, an irregular shape, or the like. It should be noted that, in the descriptions of the accompanying drawings, a same symbol is used for similar or same parts. An implementation not shown or described in the accompanying drawings is a form known to the person skilled in the art. The foregoing descriptions are merely representative specific embodiments of the embodiments of this application, but are not intended to limit the embodiments of this application. Any modification, equivalent replacement, improvement, or the like made without departing the spirit and principle of the embodiments of this application should fall within the protection scope of the embodiments of this application.

It should be noted that, for clarity of the descriptions of the embodiments of this application, unrelated components may not be shown in the reference accompanying drawings, and for clarity, thicknesses of the layers and the areas may be exaggerated. When it is stated that a layer is "on" another layer or a substrate, the layer may be directly "on" the another layer or the substrate; or a third layer may be disposed between the layer and the another layer or the substrate. In addition, although the embodiments of this application provide an example of a parameter including a specific value, it should be understood that the parameter does not need to be exactly equal to a corresponding value, but may be approximated to the corresponding value within an acceptable error margin or design constraint.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, improvement, or the like made without departing from the spirit and principle of this application should fall within the protection scope of this application.

What is claimed is:

1. A microphone chip, wherein the microphone chip comprises:
   a substrate and a diaphragm that are disposed oppositely;
   a reflector located on a side of the diaphragm and that is close to the substrate;
   a grating group located between the substrate and the diaphragm; and
   an optical emitter and an optical detector that are located between the substrate and the grating group, wherein
   the grating group comprises a plurality of gratings, and distances between at least two gratings in the plurality of gratings and the reflector are different, wherein a difference g between the distances between the at least two gratings in the plurality of gratings and the reflector satisfies:
   $(2n-1) \times \lambda/8 - \lambda/16 \leq g \leq (2n-1) \times \lambda/8 + \lambda/16$, wherein $\lambda$ is a wavelength of light emitted by the optical emitter, and n is an integer greater than 0.

2. The microphone chip according to claim 1, wherein:
   the difference g between the distances between the at least two gratings in the plurality of gratings and the reflector is an odd multiple of $\lambda/8$, and $\lambda$ is the wavelength of the light emitted by the optical emitter.

3. The microphone chip according to claim 1, wherein the microphone chip further comprises:
   a grating base located between the substrate and the diaphragm, wherein the grating group is disposed on the grating base and the light emitted by the optical emitter passes through the grating base; and
   a support structure, wherein the support structure is fastened between the substrate and the diaphragm, and the grating base is firmly connected to the support structure.

4. The microphone chip according to claim 3, wherein the plurality of gratings of the grating group are disposed at least on a side of the grating base that is close to the diaphragm, or on a side of the grating base and that is far from the diaphragm; and
   the optical emitter and the optical detector are located on the substrate.

5. The microphone chip according to claim 3, wherein:
   the plurality of gratings in the grating group are located on a side of the grating base that is close to the diaphragm; and
   the optical emitter and the optical detector are located on a side of the grating base that is away from the diaphragm.

6. The microphone chip according to claim 3, wherein:
   the grating base is provided with a first hole.

7. The microphone chip according to claim 1, wherein the microphone chip further comprises:
   a support structure, wherein the support structure is fastened between the substrate and the diaphragm; and
   each grating is fastened on the support structure.

8. The microphone chip according to claim 1, wherein the microphone chip further comprises at least one of the following:
   the diaphragm is provided with a second hole; or
   a grating comprises a plurality of slits and a peripheral area that surrounds the plurality of slits, and a third hole is disposed in the peripheral area.

9. The microphone chip according to claim 8, wherein a size range of the second hole is at least one of the following:
   the size range of the second hole is 1 μm to 200 μm; or
   a total area of the second hole on the diaphragm accounts for 1% to 5% of a total area of the diaphragm.

10. The microphone chip according to claim 1, wherein the diaphragm is a circular diaphragm.

11. The microphone chip according to claim 1, wherein a shape of a boundary of the grating group is a circular shape or an arc shape.

12. The microphone chip according to claim 1, wherein the microphone chip comprises two optical emitters including the optical emitter, and wavelengths of light emitted by the two optical emitters are respectively $\lambda_1$ and $\lambda_2$, wherein $\lambda$ satisfies $\lambda=$ $$\lambda = \frac{\lambda_1 \times \lambda_2}{|\lambda_1 - \lambda_2|}.$$

13. The microphone chip according to claim 1, wherein the microphone chip comprises one optical emitter and three optical detectors including the optical detector, wherein the three optical detectors are separately configured to receive diffracted light at an order −1, diffracted light at an order 0, and diffracted light at an order +1 that are diffracted by the grating group.

14. The microphone chip according to claim 1, wherein the microphone chip further comprises:
   a control circuit, wherein the control circuit controls the optical emitter to emit light.

15. A microphone, comprising the microphone chip according to claim 1 and a packaging structure of the microphone chip.

* * * * *

UNITED STATES PATENT AND TRADEMARK OFFICE
CERTIFICATE OF CORRECTION

| | | |
|---|---|---|
| PATENT NO. | : 11,902,742 B2 | Page 1 of 1 |
| APPLICATION NO. | : 17/681285 | |
| DATED | : February 13, 2024 | |
| INVENTOR(S) | : Dongming Fang and Ming Li | |

It is certified that error appears in the above-identified patent and that said Letters Patent is hereby corrected as shown below:

In the Claims

Column 30, Line 29, Claim 12, after "satisfies" please delete "$\lambda=$".

Signed and Sealed this
Seventh Day of May, 2024

Katherine Kelly Vidal
*Director of the United States Patent and Trademark Office*